(12) United States Patent
Kosloski et al.

(10) Patent No.: US 9,754,020 B1
(45) Date of Patent: Sep. 5, 2017

(54) METHOD AND DEVICE FOR MEASURING WORD PAIR RELEVANCY

(71) Applicant: National Security Agency, Ft. George G. Meade, MD (US)

(72) Inventors: Jon T. Kosloski, Cantonsville, MD (US); John W. Thompson, San Diego, CA (US)

( * ) Notice: Subject to any disclaimer, the term of this patent is extended or adjusted under 35 U.S.C. 154(b) by 715 days.

(21) Appl. No.: 13/987,284

(22) Filed: Mar. 6, 2014

(51) Int. Cl.
*G06F 17/30* (2006.01)

(52) U.S. Cl.
CPC .. *G06F 17/30684* (2013.01); *G06F 17/30687* (2013.01)

(58) Field of Classification Search
CPC ................................................ G06F 17/30663
See application file for complete search history.

(56) References Cited

U.S. PATENT DOCUMENTS

| | | | |
|---|---|---|---|
| 6,006,221 A | 12/1999 | Liddy et al. | |
| 6,675,159 B1 | 1/2004 | Lin et al. | |
| 7,716,216 B1 | 5/2010 | Harik | |
| 7,788,251 B2 | 8/2010 | Carlson et al. | |
| 8,321,425 B2 | 11/2012 | Custis et al. | |
| 8,892,422 B1 * | 11/2014 | Kumar | G06F 17/2775 704/1 |
| 9,201,876 B1 * | 12/2015 | Kumar | G06F 17/30 |
| 2002/0111792 A1 | 8/2002 | Cherny | |
| 2004/0093331 A1 * | 5/2004 | Garner | G06N 5/022 |
| 2004/0162827 A1 | 8/2004 | Nakano | |
| 2008/0021891 A1 | 1/2008 | Ikeda | |
| 2008/0114750 A1 | 5/2008 | Saxena | |
| 2009/0198674 A1 | 8/2009 | Custis | |
| 2009/0319508 A1 | 12/2009 | Yih | |
| 2011/0016111 A1 | 1/2011 | Xie | |
| 2013/0144872 A1 | 6/2013 | Gupta et al. | |
| 2013/0144889 A1 | 6/2013 | Gupta et al. | |
| 2015/0227559 A1 * | 8/2015 | Hatami-Hanza | G06F 17/30292 707/748 |

OTHER PUBLICATIONS

Chen, Zilong et al.; A Word Co-occurrence Matrix Based Method for Relevance Feedback; Journal of Computational Information Systems 7:1(2011) 17-24.
Cao, Guihong et al.;Constructing Better Document and Query Models with Markov Chains;CIKM '06 Proceedings of 15th ACM Int'l Conf on Info & Knowledge Mgmt; pp. 800-801; New York.
Daniowicz, Czeslaw et al.; Abstract of Document Ranking Based Upon Markov Chains; Info. Proc. and Mgmt (Journal); vol. 37, Iss 4, Jul. 2001; pp. 623-637; Elsevier Science LTD USA.
Breyer, L.A.; Markovian Page Ranking Distributions: Some Theory and Simulations; http://citeseerx.ist.psu.edu/viewdoc/summary?doi=10.1.1.174.5128.
Hoffmeister, Bjorn et al.; Text Minding Using Markov Chains of Variable Length; Federation Over the Web, Lecture Notes in Comp Sci, vol. 3847 2006 pp. 1-24, Springer Berlin.
Office Action dated Oct. 19, 2016 issued by the United States Patent Office in connection with U.S. Appl. No. 13/987,283, filed Mar. 6, 2014.

* cited by examiner

*Primary Examiner* — Mohammad S Rostami

(57) ABSTRACT

A method and device provide a word pair relevancy measure for a seed word-keyword pair. A set of documents is provided from which a co-occurrence matrix is created. The co-occurrence matrix is utilized to determine a transition probability and an expected search depth from which the word pair relevancy is determined.

20 Claims, 18 Drawing Sheets

Unit 1: The man ran a race.
Unit 2: The man ran with the dog.
Unit 3: A dog chased a ball.
Unit 4: The ball bounces.
Unit 5: The run.

| | | A | ran | dog | the | with | man | ball | chased | race | bounces | run |
|---|---|---|---|---|---|---|---|---|---|---|---|---|
| | A | 3 | 2 | 2 | 3 | 1 | 2 | 1 | 1 | 1 | 0 | 0 |
| 128 | ran | 2 | 2 | 1 | 2 | 1 | 2 | 0 | 0 | 1 | 0 | 0 |
| | dog | 2 | 1 | 2 | 2 | 1 | 1 | 1 | 1 | 0 | 0 | 0 |
| | the | 3 | 2 | 2 | 5 | 1 | 2 | 2 | 1 | 1 | 1 | 1 |
| | with | 1 | 1 | 1 | 1 | 1 | 1 | 0 | 0 | 0 | 0 | 0 |
| $d_j$ | man | 2 | 2 | 1 | 2 | 1 | 2 | 0 | 0 | 1 | 0 | 0 |
| | ball | 1 | 0 | 1 | 2 | 0 | 0 | 2 | 1 | 0 | 1 | 0 |
| | chased | 1 | 0 | 1 | 1 | 0 | 0 | 1 | 1 | 0 | 0 | 0 |
| | race | 1 | 1 | 0 | 1 | 0 | 1 | 0 | 0 | 1 | 0 | 0 |
| | bounces | 0 | 0 | 0 | 1 | 0 | 0 | 1 | 0 | 0 | 1 | 0 |
| | run | 0 | 0 | 0 | 1 | 0 | 0 | 0 | 0 | 0 | 0 | 1 |

|         | A    | ran  | dog  | the  | with | man  | ball | chased | race | bounces | run  |
|---------|------|------|------|------|------|------|------|--------|------|---------|------|
| A       | 0.60 | 0.40 | 0.40 | 0.60 | 0.20 | 0.40 | 0.20 | 0.20   | 0.20 | 0.00    | 0.00 |
| ran     | 0.40 | 0.40 | 0.20 | 0.40 | 0.20 | 0.40 | 0.00 | 0.00   | 0.20 | 0.00    | 0.00 |
| dog     | 0.40 | 0.20 | 0.40 | 0.40 | 0.20 | 0.20 | 0.20 | 0.20   | 0.00 | 0.00    | 0.00 |
| the     | 0.60 | 0.40 | 0.40 | 1.00 | 0.20 | 0.40 | 0.40 | 0.20   | 0.20 | 0.20    | 0.20 |
| with    | 0.20 | 0.20 | 0.20 | 0.20 | 0.20 | 0.20 | 0.00 | 0.00   | 0.00 | 0.00    | 0.00 |
| man     | 0.40 | 0.40 | 0.20 | 0.40 | 0.20 | 0.40 | 0.00 | 0.00   | 0.20 | 0.00    | 0.00 |
| ball    | 0.20 | 0.00 | 0.20 | 0.40 | 0.00 | 0.00 | 0.40 | 0.20   | 0.00 | 0.20    | 0.00 |
| chased  | 0.20 | 0.00 | 0.20 | 0.20 | 0.00 | 0.00 | 0.20 | 0.20   | 0.00 | 0.00    | 0.00 |
| race    | 0.20 | 0.20 | 0.00 | 0.20 | 0.00 | 0.20 | 0.00 | 0.00   | 0.20 | 0.00    | 0.00 |
| bounces | 0.00 | 0.00 | 0.00 | 0.20 | 0.00 | 0.00 | 0.20 | 0.00   | 0.00 | 0.20    | 0.00 |
| run     | 0.00 | 0.00 | 0.00 | 0.20 | 0.00 | 0.00 | 0.00 | 0.00   | 0.00 | 0.00    | 0.20 |

|         | A    | ran  | dog  | the  | with | man  | ball | chased | race | bounces | run  |
|---------|------|------|------|------|------|------|------|--------|------|---------|------|
| A       | 0.19 | 0.13 | 0.13 | 0.19 | 0.06 | 0.13 | 0.06 | 0.06   | 0.06 | 0.00    | 0.00 |
| ran     | 0.18 | 0.18 | 0.09 | 0.18 | 0.09 | 0.18 | 0.00 | 0.00   | 0.09 | 0.00    | 0.00 |
| dog     | 0.18 | 0.09 | 0.18 | 0.18 | 0.09 | 0.09 | 0.09 | 0.09   | 0.00 | 0.00    | 0.00 |
| the     | 0.14 | 0.10 | 0.10 | 0.24 | 0.05 | 0.10 | 0.10 | 0.05   | 0.05 | 0.05    | 0.05 |
| with    | 0.17 | 0.17 | 0.17 | 0.17 | 0.17 | 0.17 | 0.00 | 0.00   | 0.00 | 0.00    | 0.00 |
| man     | 0.18 | 0.18 | 0.09 | 0.18 | 0.09 | 0.18 | 0.00 | 0.00   | 0.09 | 0.00    | 0.00 |
| ball    | 0.13 | 0.00 | 0.13 | 0.25 | 0.00 | 0.00 | 0.25 | 0.13   | 0.00 | 0.13    | 0.00 |
| chased  | 0.20 | 0.00 | 0.20 | 0.20 | 0.00 | 0.00 | 0.20 | 0.20   | 0.00 | 0.00    | 0.00 |
| race    | 0.20 | 0.20 | 0.00 | 0.20 | 0.00 | 0.20 | 0.00 | 0.00   | 0.20 | 0.00    | 0.00 |
| bounces | 0.00 | 0.00 | 0.00 | 0.33 | 0.00 | 0.00 | 0.33 | 0.00   | 0.00 | 0.33    | 0.00 |
| run     | 0.00 | 0.00 | 0.00 | 0.50 | 0.00 | 0.00 | 0.00 | 0.00   | 0.00 | 0.00    | 0.50 |

METHOD AND DEVICE FOR MEASURING WORD PAIR RELEVANCY

FIELD OF THE INVENTION

This invention is generally directed to a method and device for determining the relevancy of pairs of words and to a method and device for ranking the relevancy of documents to a keyword based upon the relevancy of the pairs of words.

BACKGROUND OF THE INVENTION

Identifying information related to a given topic within large collections of documents is an ongoing challenge. The most common method is to use Boolean keyword searches to find documents that mention particular terms, but there are inherent limitations to using Boolean keyword searches to identify documents of potential interest. One limitation is that when a specific keyword is used in the Boolean search, there is a risk that the Boolean search will not return a relevant document because the document does not use the same phrasing or nomenclature of that specific keyword. On the other hand if a more general keyword is used in the Boolean search, there is a risk that the Boolean search will return a set of documents too large for a searcher to analyze all of the documents within a reasonable time. Thus, the limitations provided by using Boolean searches to gauge the relevancy of a document to a keyword reduces the efficiency with which information can be gleaned from large sets of documents. Although a human who manually searches documents for text relevant to a keyword often easily addresses the shortcomings of a Boolean search by employing intuition developed through years of familiarity with language as well as familiarity with a breadth of topics, when large document sets are to be reviewed, manual review is not practical.

In an effort to increase the efficiency with which sets of documents can be reviewed, other methods are used to assess the relevancy of documents identified by a search. Some internet search engines, for example, assess relevancy by prioritizing the documents (for example, web pages) that are returned to the user. More specifically, for example, some search engines use crowd sourcing which ranks the relevancy of documents returned from a Boolean search based upon the popularity or page-rank of those documents. Although priority or relevancy rankings based upon crowd sourcing works very well in instances where the search engine has sufficient users to generate the necessary statistics, it is poorly suited to more niche applications. For example, crowd sourcing is ill suited to small intranets, or within a single internet domain, because the volume of users may not be large enough to generate accurate relevancy rankings. Additionally, crowd sourcing may not generate accurate relevancy rankings when obscure search terms are used because the yielded results have not been viewed a sufficient number of times to be prioritized by popularity.

Because, many documents include common words (e.g. "the", "a", "that", . . . ) which have no particular relevancy to the document or the keyword, some prior art methods for determining the relevancy of documents involve the elimination of the effect of these common words on the results. Such methods require, however, the identification of the common words and therefore knowledge of the language utilized in the documents containing these words is required.

SUMMARY OF THE INVENTION

Briefly, the present invention discloses a method and device for determining the relevancy of a pair of words (i.e.

the relevancy of a first word in the pair to the second word in the pair) and for ranking relevancy of documents to a keyword(s) based upon the word pair relevancy measures. A first set (training set) of documents is used to determine word pair relevancy measures. The word pair relevancy measures are determined based upon a co-occurrence matrix, a probability matrix, a transition matrix and an expected search distance measure. These word pair relevancy measures are then utilized to determine document relevancy measures for documents in a second set (live set). Once document relevancy measures are determined, the documents of the second set are ranked in accordance with the relevancy measures.

BRIEF DESCRIPTION OF THE DRAWINGS

The organization and manner of the structure and operation of the invention, together with objects and advantages thereof, may best be understood by reference to the following description, taken in connection with the accompanying drawings, wherein like reference numerals identify like elements in which:

FIG. 5 illustrates the units derived from the first set of documents of FIG. 3;

FIG. 6 illustrates a co-occurrence matrix derived from the first set of documents of FIG. 3;

FIG. 7 illustrates a probability matrix derived from the co-occurrence matrix of FIG. 6;

FIG. 8 illustrates a transition matrix derived from the probability matrix of FIG. 7;

DETAILED DESCRIPTION OF THE PREFERRED EMBODIMENT

Figure 1:
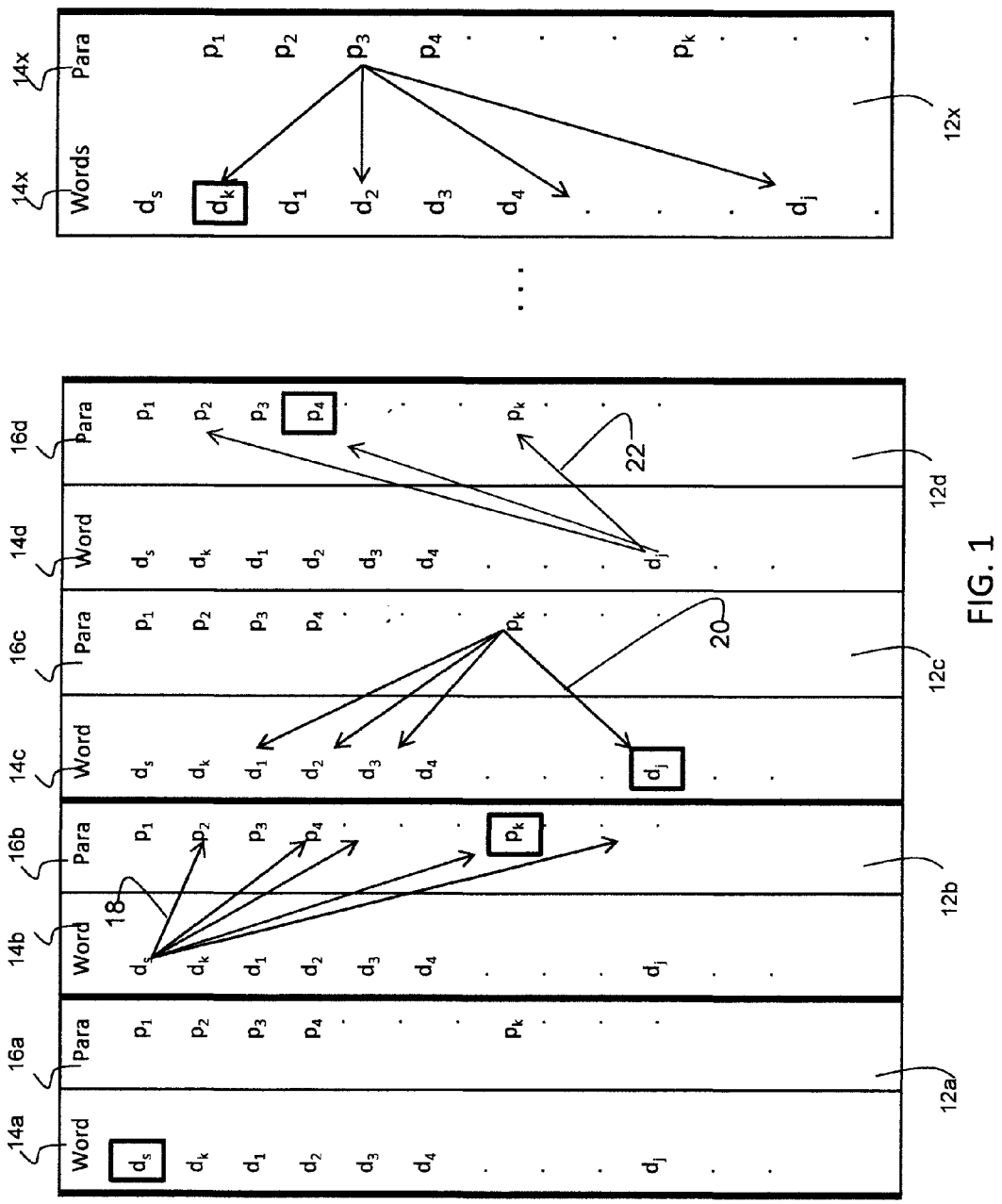
FIG. 1 illustrates a model for determining word pair relevancy.

While the invention may be susceptible to embodiment in different forms, there is shown in the drawings, and herein will be described in detail, specific embodiments with the understanding that the present disclosure is to be considered an exemplification of the principles of the invention, and is not intended to limit the invention to that as illustrated and described herein.

The present invention provides a device and method for determining the relevancy of pairs of words and for determining the relevancy of a keyword(s) to a document. The invention utilizes the following assumptions. The first assumption is that the occurrence of words together in a unit of text implies a relevancy between those words, i.e. the occurrence of a first word and a second word in the same unit of text implies a relevancy between the first word and the second word. A second, further assumption is that the relevancy between the first word and the second word is weakly transitive, i.e. the occurrence of the second word in the same unit of text as a third word, but different from the unit of text that contained both the first and second word, implies a relevancy between the first word and the third word. The relevancy between the first word and the third word is not as strong, however, as the relevancy between the first word and the second word (or the relevancy between the second word and the third word). Utilizing these assumptions, the present invention provides an approximation of the intuition provided by a human reviewer and allows large data sets to be handled efficiently.

The assumption that the occurrence of a pair of words in a unit of text implies relevancy provides a basis for the relevancy model utilized by the present invention. This relevancy model is illustrated in FIG. 1.

The relevancy model illustrated in FIG. 1 illustrates how the above assumptions are utilized to measure the relevancy of a pair of words, e.g. a first word and a second word. FIG. 1 includes a plurality of blocks 12. Each block (12a, 12b, 12c, ... 12x) of FIG. 1 includes a word node column 14 and a unit node column 16. The word node column 14 represents each of the words (d) which occur in a body of documents and the unit node column 16 represents units of text (p) within the body of documents. At block 12a the search word $d_s$ is identified in word node column 14a and is used as the first word of the pair. A search then proceeds to locate the second word or keyword $d_k$. At block 12b, each of the units p including the search word $d_s$ are identified. The arrows 18 leading from $d_s$ of the word node column 14b to the unit node of column 16b illustrate the possible transitions from the node $d_s$ of the word node column 14b to a node in the unit node column 16b. A unit $p_k$ is randomly selected from these identified units in the unit node column 16b. Next, at block 12c, the words included in the unit $p_k$ are identified by the arrows 20 leading from $p_k$ to the word node column 14c. All arrows that originate at a particular node will connect with nodes in the opposite column. The arrows (which are not all shown) represent the presence of a particular word in a particular unit (represented by arrows directed from the word node column 14 to the unit node column 16) or represent the presence of the words provided in a particular unit (represented by arrows directed from the unit node column 16 to the word node column 14). All of the arrows originating at a particular node have equal transition probabilities.

After the identification of the words in the selected unit, a new search word $d_j$ is randomly selected from the identified words. At block 12d, the units of column 16d including the new search word $d_j$ are identified. The arrows 22 leading from word node $d_j$ to the second column 16d illustrate the possible transitions from the node $d_j$ of the word node column 14d to a node in the unit node column vc16d. One of the identified units, $p_4$, is randomly selected from the unit node column 16d of block 12d. This process continues until at block 12x a unit $p_3$ is selected which includes the keyword $d_k$. As additional units are examined to determine the presence of the keyword $d_k$, the search distance increases. A "search distance" is defined therefore as the number of word nodes traversed in the search while transitioning from the node representing the first word $d_t$ or search word $d_s$ to the node representing the second word $d_j$ or keyword $d_k$.

Because the model provides that the units and search words are selected randomly, a different chain of words and units will result each time the model is applied thereby resulting in the possibility that a different search distance will be determined when the search is repeated for the same pair of words. It is therefore useful to determine the mean search distance of a pair of words. This mean is identified as the "expected search distance."

The search model described above provides a basis for determining the expected search distance from which a word pair relevancy can be determined for a pair of words. These determinations are made based upon a first set of documents, sometimes referred to herein as "training documents" or collectively referred to as a "training set" X.

Figure 2:
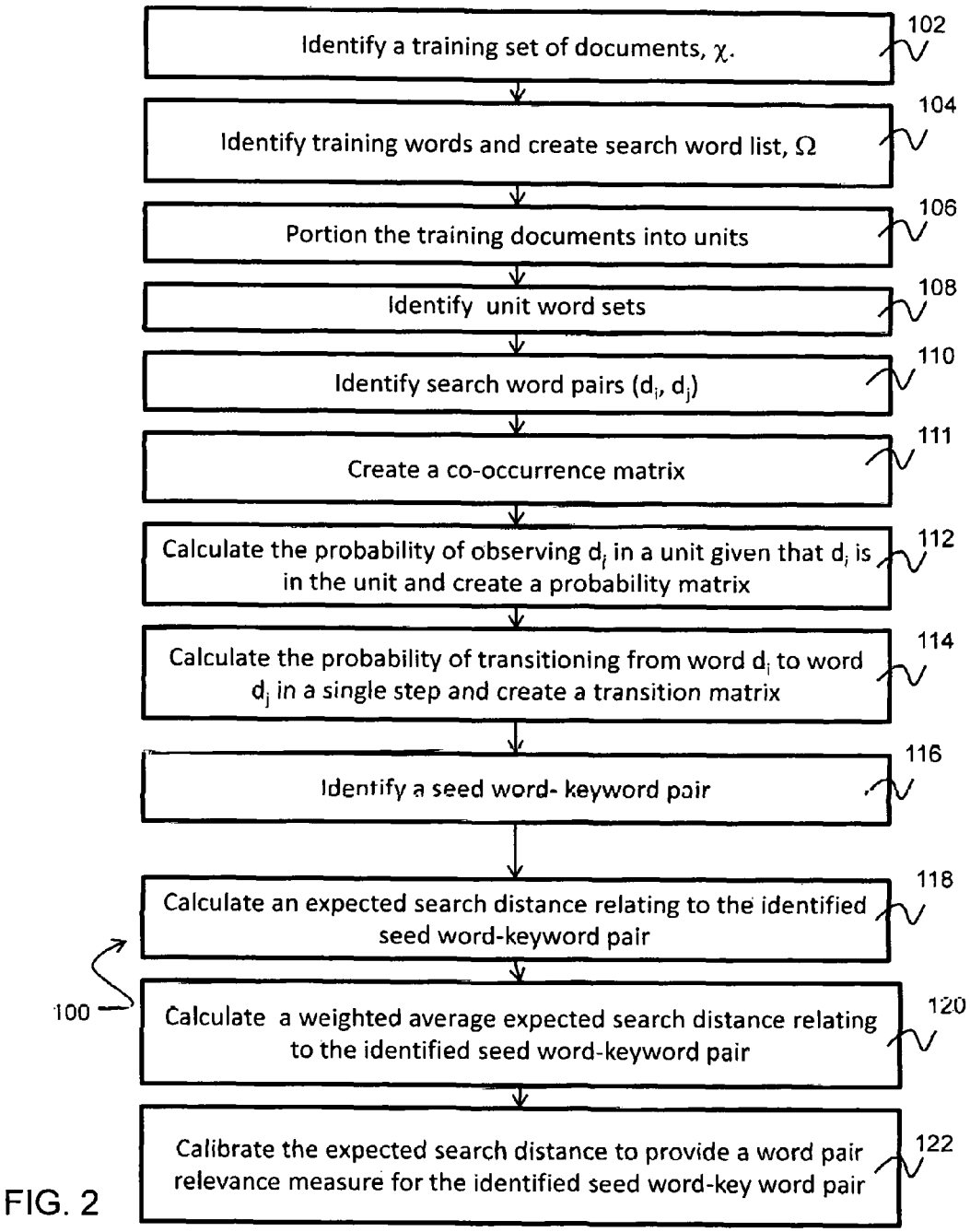
FIG. 2 illustrates a method of determining a word pair relevancy.
Figure 3:
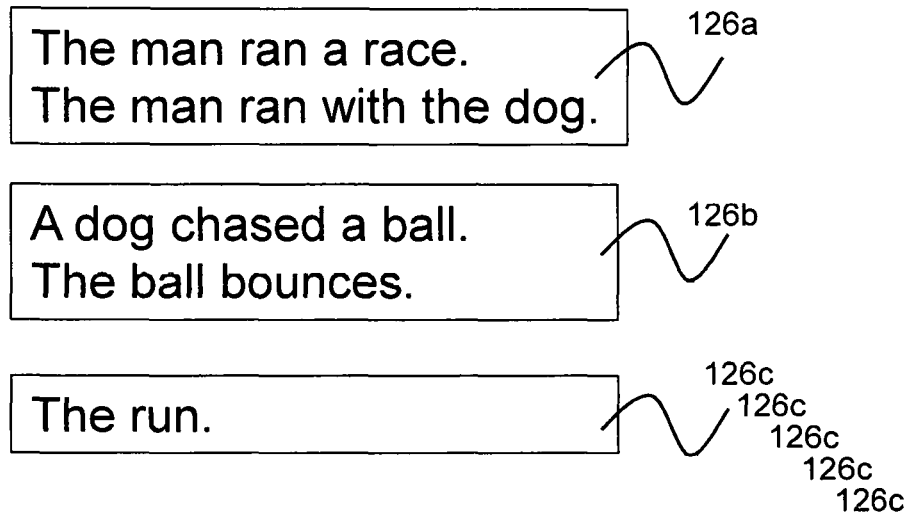
FIG. 3 illustrates a simplified example of a first set of documents (training set)

The method 100 of calculating a word pair relevancy is illustrated in FIG. 2. As illustrated in FIG. 2, the process 100 begins at step 102 by identifying a training set of documents. In addition to other types of documents, this training set, X, preferably includes literature from the same general field as the documents to be ranked (i.e., the "live documents"). The training set can, for example, be created from open sources such as Wikipedia, free e-books, openly available scientific papers, articles, or Tweets. Alternatively, for example, the training set, X, could be created from a specialized private collection of documents. A simplified example of a training set X, is illustrated in FIG. 3. As illustrated the training set includes three documents 126a, 126b, and 126c.

Figure 4:
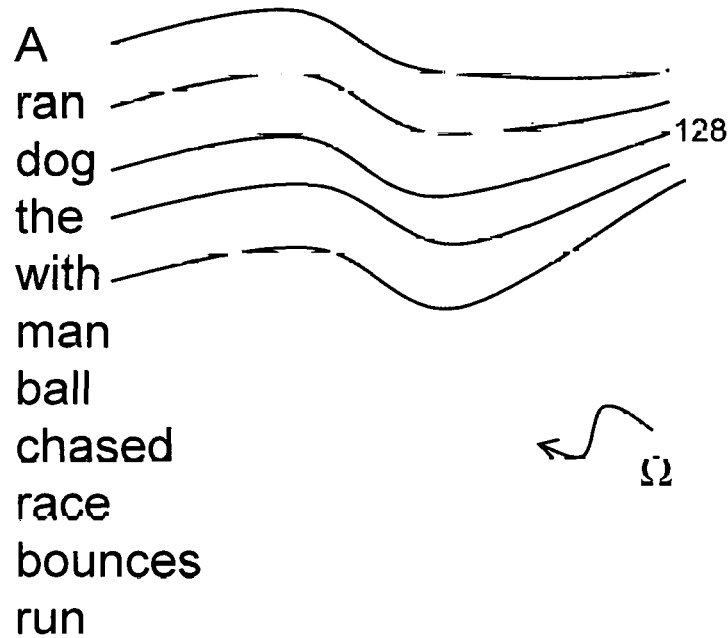
FIG. 4 illustrates the search word list derived from the first set of documents of FIG. 3.

As illustrated in FIG. 2, once the training set, X, has been identified at step 102, at step 104 each word of each training document within the training set is identified, and a search word list, $\Omega$, is created. Each of the words on this list will be referred to as a search word. Search words can be identified, for example, utilizing a computer program such as Python's Natural Language Tool Kit, to remove all punctuation from the documents and then identify all strings of characters separated by spaces. These strings of characters are identified as search words and are utilized to create the search word list, $\Omega$. Duplicates are not included in the search word list, $\Omega$. Therefore, the search word list, $\Omega$, provides a set of unique words found in the training set. It is to be understood that the search word list, $\Omega$, may include, for example, words from multiple languages, series of numbers or mathematical symbols. A search word list, $\Omega$, derived from the training set X of FIG. 3 is illustrated in FIG. 4. The search word list includes a plurality of search words 128.

As illustrated in FIG. 2, at step 106, the training documents are portioned into units of text, i.e. "units". It should be noted that the definition of a unit may vary for different applications. A unit can be, for example, a paragraph. Alternatively, a unit can be defined as a sentence, or a chapter, for example. It has been found that, for western languages, defining the unit as a paragraph has been beneficial. If for example the unit is defined as a paragraph, break lines between paragraphs can be used to identify the units. If the unit is defined as a sentence, ending punctuation (i.e. period, question mark, exclamation mark . . . ) may be used to identify the units. If the unit is to be defined as a page, a page break can be used to define the units. Thus, a variety of methods may be used to portion the training documents into units. As illustrated in FIG. 5, units 130 were derived from the set, X, of FIG. 3. As illustrated, sentences were selected as the units and five units of text 130 are provided.

Referring back to FIG. 2, at step 108 unit word sets are created. Once the units have been identified, a unit word set is created for each unit of text. The unit word set consists of each word identified in the unit. If a word is repeated within the unit, the unit word set contains only one instance of the word, thereby removing any redundancy within the unit word set.

As noted above, the intuition provided by human searching can, in part, be approximated by utilizing the assumption that the occurrence of words together in a unit of text implies a relevancy between those words. Thus, determining the likelihood that two words will appear together in a unit will assist in determining the relevancy of the words. At step 110, therefore, word pairs are identified. More specifically, each word from the search word list, $\Omega$, is paired with another word from the search word list, $\Omega$, to define search word pairs $(d_i, d_j)$.

At step 111 the co-occurrence matrix, C (X), is created. The co-occurrence matrix provides a column associated with each word from the search word list, $\Omega$, and a row associated with each word from the search word list, $\Omega$. The size of the co-occurrence matrix is, therefore, $|\Omega|$ by $|\Omega|$. Each matrix entry associated with a particular column and row identifies a training pair count $C_{i,j}(X)$. The training pair count, $C_{i,j}(X)$, represents the number of units where the words $d_i$ and $d_j$ occur together in a unit and the words are in the search word list $\Omega$. It is understood that many of the entries, $C_{i,j}(X)$, of the co-occurrence matrix, may be zero. Therefore, when storing the co-occurrence matrix on a computer, the size of the co-occurrence matrix may be greatly reduced by eliminating the zero entries from the co-occurrence matrix. A co-occurrence matrix 140 is illustrated in FIG. 6 and represents the co-occurrence matrix relating to the simplified training set, X, of FIG. 3. Each search word 128 of the search word list, $\Omega$, is provided in a column to provide a plurality of first words, $d_i$, and each search word 128 of the search word list, $\Omega$, is provided in row to provide a plurality of second words, $d_j$. The search pair count $C_{i,j}(X)$ is provided for each entry of the co-occurrence matrix. As shown in FIG. 6, the search pair (the, man) was found in two unit word sets (i.e. Unit 1 and Unit 2) and the search pair (dog, chased) was found in one unit word set (Unit 3). It should be noted that the entry for any instance wherein the column and the row identify the same search word (i.e. where $d_i$ and $d_j$ are the same word) will be one or greater if the word occurred in the set, as it is a count of the number of units that contained that search word.

As noted above, the intuition provided by human searching can, in part, be approximated by utilizing the assumption that the relevancy of words occurring together is weakly transitive. It is therefore useful to quantify the transitive relationship of words in the training set. At step 112 of FIG. 2 therefore, the probability of observing $d_j$ in a unit given that $d_i$ is in the unit is calculated. $\chi$ represents the total number of units provided in the training set X, and $C_{i,j}$ represents the total number of units provided in the training set X that contain $d_i$. The co-occurrence matrix C(X) is divided by the total number of units in the training set, $\chi$, to give the probability $P(d_i, d_j)$ of observing words $d_i$ and $d_j$ together in a unit. The elements $C_{i,j}$ are divided by $\chi$ to give the probability $P(d_i)$ of observing the word $d_i$ in a unit. A probability matrix M, can therefore be created from the co-occurrence matrix as follows:

$$M_{i,j} = P(d_j \mid d_i) = \frac{P(d_i, d_j)}{P(d_i)} = \frac{C_{i,j}}{C_{i,i}}$$

The probability matrix, $M_{i,j}$ therefore represents the probability of observing word $d_j$ in a unit given that $d_i$ is in the unit; i.e. a conditional co-occurrence probability. A probability matrix, 142 derived from the co-occurrence matrix 140 is illustrated in FIG. 7.

Referring back to FIG. 2, at step 114 the probability matrix, M, is then row-normalized to provide the transition matrix, R, as follows:

$$R_{i,j} = \frac{C_{i,j}}{\Sigma_z C_{i,z}}$$

The transition matrix element $R_{i,j}$ represents the probability of transitioning from a first search word, $d_i$, to a second search word, $d_j$ in a single step; i.e. the transition probability reflects the probability, when randomly choosing from the units containing the word, $d_i$, that a unit having the word, $d_j$, will be chosen. The closer the relationship between the words $d_i$ and $d_j$, the greater the transition probability. A transition matrix, 144 derived from the probability matrix 142 of FIG. co-occurrence matrix 140 is illustrated in FIG. 8.

A search distance can be utilized to quantify the relationship of a pair of words $(d_i, d_j)$ provided by the training set (i.e., a search word pair). As discussed above, the search model provides a search distance which is defined as the number of searches needed (or word nodes traversed) to transition from a first word to second word. At step 116, the seed word-keyword pair $(d_s, d_k)$ for which relevancy is to be determined is identified.

At step 118, an expected search distance is calculated for the identified seed word-keyword pair. The expected search distance of the seed word-keyword pair is determined based upon the co-occurrence information provided by the training set, the probability matrix and transition matrix. The expected search distance for each identified seed word-keyword pair thereby quantifies the transitive relationship of the seed word-key word pairs. More specifically, the expected search distance is expressed as:

$$\vec{c}_{d,k} = \sum_{n=1}^{\infty} n [\vec{\Gamma}(d)]^T \cdot [(I - \vec{\Gamma}(k) \otimes \vec{\Gamma}(k)) \cdot R \cdot (I - \vec{\Gamma}(k) \otimes \vec{\Gamma}(k))]^{n-1} \cdot M \cdot \vec{\Gamma}(k)$$

$$\vec{c}_{d,k} = \sum_{n=1}^{\infty} n [\vec{\Gamma}(d)]^T \cdot \vec{\alpha}_n(k)$$

where $\vec{\alpha}_1(k) = M \cdot \vec{\Gamma}(k)$, for n=1;
and $\vec{\alpha}_n(k) = [(I - \vec{\Gamma}(k) x \vec{\Gamma}(k)) \cdot R \cdot (I - \vec{\Gamma}(k) x \vec{\Gamma}(k))] \cdot \vec{\alpha}_{n-1}(k)$, for n≥2.

T indicates the transpose of the vector, while the superscript "n−1" indicates exponentiation of the square matrix.

$\Gamma$(j) is a vector that identifies the entries in the transition matrix R and the probability matrix M which relate to the particular seed word or keyword such that $$\Gamma_i(j) = \delta_{i,j} \forall d_i, d_j \in \Omega,$$

where $\delta_{i,j}$ is the Kronecker delta. I is a $|\Omega|$ by $|\Omega|$ identity matrix, and $\otimes$ is the outer product.

The expected search distance, $\bar{c}_{d,k}$, for disjointed words will have a measure of infinity. The expected search distance, $\bar{c}_{d,k}$, for highly related words will have a very low measure. Although the equation provided above indicates the expected search distance requires an infinite summation, in practice a few hundred transitions are sufficient before a useful precision of several decimal points is reached. $\bar{c}_{d,k}$ is therefore represented by:

$$\bar{c}_{d,k} = \sum_{n=i}^{g} n[\vec{\Gamma}(d)]^T \cdot [(I - \vec{\Gamma}(k)x\vec{\Gamma}(k)) \cdot R \cdot (I - \vec{\Gamma}(k)x\vec{\Gamma}(k))]^{n-1} \cdot M \cdot \vec{\Gamma}(k)$$

where g is the upper limit of the summation.

Because the expected search distance will be affected by the frequency with which a word occurs, a weighted average expected search distance is calculated at step 120. The weighted average expected search distance is calculated as follows:

$$\tilde{c}_k = \sum_{n=1}^{\infty} n[\vec{\psi}]^T \cdot \left[(I - \vec{\Gamma}(k) \otimes \vec{\Gamma}(k)) \cdot R \cdot (I - \vec{\Gamma}(k) \otimes \vec{\Gamma}(k))\right]^{n-1} \cdot M \cdot \vec{\Gamma}(k)$$

$$\tilde{c}_k = \sum_{n=1}^{\infty} n[\vec{\psi}]^T \cdot \vec{\alpha}_n(k)$$

wherein the calibrating column vector $\psi$ is created as follows:

$$\psi_i = \frac{p(d_i)}{\sum_{d_j \in \Omega} P(d_j)} = \frac{C_{i,i}}{\sum_{ji} C_{j,j}}$$

and wherein $\psi_i$ represents the probability of randomly selecting a unit that contains the word $d_i$. $\psi_i$ provides the ability to calibrate the measure relative to the average distance it would take to traverse from a randomly chosen word to the keyword, $d_k$. $\tilde{c}_k$ therefore, represents the weighted average expected search distance from all possible seed words, $d_s$, to the keyword, $d_k$. The upper limit of the summation can again be defined as g and $\tilde{c}_k$ is represented by:

$$\tilde{c}_k = \sum_{n=1}^{g} n[\vec{\psi}]^T \cdot \left[(I - \vec{\Gamma}(k) \otimes \vec{\Gamma}(k)) \cdot R \cdot (I - \vec{\Gamma}(k) \otimes \vec{\Gamma}(k))\right]^{n-1} \cdot M \cdot \vec{\Gamma}(k)$$

As noted, common words occurring in the training set will bias the expected search distance $\tilde{c}_{d,k}$ making common words appear to be relevant to all words. Calibration of the expected search distance using the weighted average expected search distance mitigates the effects of common words on the expected search distance measurement. Thus, rather than using the expected search distance directly, at step 122, a word pair relevancy measure is calculated. The word pair relevancy is provided by the ratio of the expected search distance for the seed word-keyword pair relative to the weighted average expected search distance of the keyword (averaged over all possible seed words). This word pair relevancy measure is provided by:

$$s_{d,k} = \frac{\bar{c}_{d,k}}{\tilde{c}_k}$$

Although the expected search distance, $\bar{c}_{d,k}$, is biased and makes all common words appear to be important, when $\bar{c}_{d,k}$ is divided by the corresponding weighted average expected search distance, $\tilde{c}_k$, the impact of that bias is greatly reduced and a particularly useful word pair relevancy measurement is provided.

With this calibration, a word that is neutrally relevant to all words will have a word pair relevancy measure near 1 with all words, and a word that is perfectly correlated with a keyword will have a word pair relevancy measure of ($1/\tilde{c}_k$). The word pair relevancy measure for disjointed words will be near infinity.

This calibrated word pair relevancy measure has a variety of advantages over the measure of expected search distance. One advantage is that the measurement of the relevancy of a particular seed word to itself is a function of the average search distance from a random seed word to it. Therefore, very common words such as "the" will have less significant scores to themselves than uncommon words. The examples provided herein will demonstrate that this feature eliminates the need to identify and remove common words from the analysis. Ranking documents relative to a keyword without the need to explicitly account for common or rare words in pre-processing distinguishes the present invention from prior art searching and ranking methods. Although $0 \leq s_{d,k} \leq \infty$ in principle, the summation over the number of searches (transitions) n will be finite in practice, so $1/N \leq s_{d,k} \leq N$ when the summation is over N searches.

Figure 9:
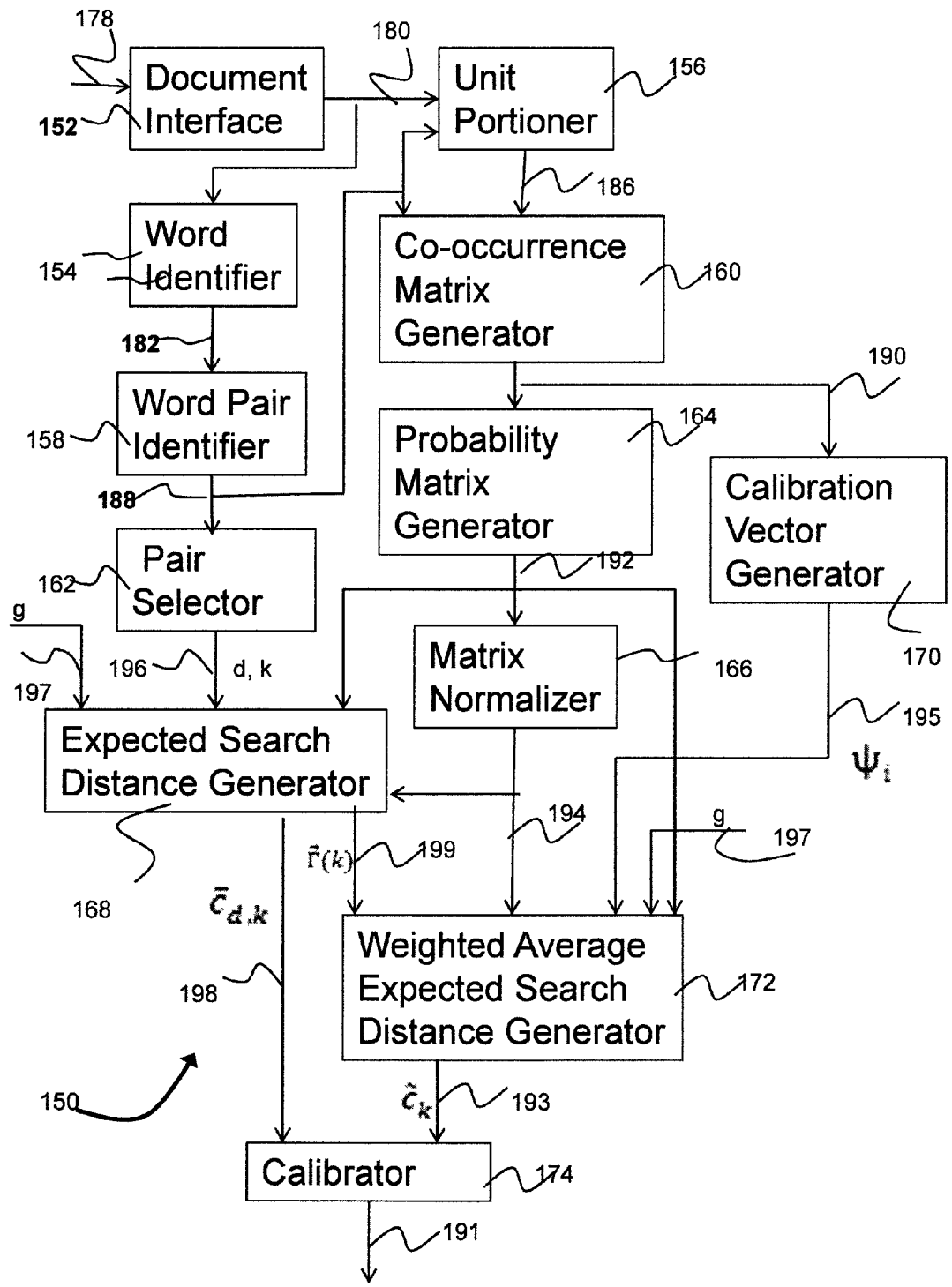
FIG. 9 illustrates a device for determining word pair relevancy.

FIG. 9 illustrates a device 150 of the present invention for determining relevancy of a pair of words (e.g., a first word and a second word, or a seed word and a keyword). The device 150 generally includes an interface 152, a word identifier 154, a unit portioner 156, a word pair identifier 158, a co-occurrence matrix generator 160, a word pair selector 162, a probability matrix generator 164, a matrix normalizer 166, an expected search distance generator 168, a calibrating vector generator 170, a weighted average expected search distance generator 172, and a calibrator 174.

The interface 152 includes an input 178 and an output 180. Information regarding a first set of documents is received on the input 178. Information regarding the first set (i.e. the training set) of documents, X, and regarding individual documents in the training set is received by the interface 152. The interface 152 provides information regarding the training documents at the output 180 of the interface 152.

The word identifier 154 identifies the words of the training set, X. The word identifier 154 is in communication with the interface 152 via the output 180 of the interface 152. The word identifier 154 further includes an output 182 for communication with the word pair identifier 158. As noted above, the word identifier 154 may, for example, utilize a computer program such as Python's Natural Language Tool Kit. Upon identifying the unique search words of the training set documents, the search word list, $\Omega$, is created and provided on the output 182.

The word pair identifier 158 includes a first input and an output 188. The input of the word pair identifier 158 is in communication with the word identifier 154 via the output 182 of the word identifier 154. The word pair identifier 158 pairs each search word, $d_i$, with another search word, $d_j$, to define search word pairs $(d_i, d_j)$, where $d_i$, and $d_j$, may be the same word, thereby identifying each possible pair which can be identified from the search word list. Each word pair identified is provided at the output 188 and is provided to the unit portioner 156, the co-occurrence matrix generator 160, and the word pair selector 162. The word pair identifier 158 is realized on a microprocessor, a discreet circuit, or an ASIC.

The unit portioner 156 is in communication with the output 180 of the interface 152, to receive information regarding the training documents. The unit portioner 156 identifies the "units" of the training documents. The unit portioner 156 has a first input associated with the output 180 of the interface 152, a second input associated with the output 188 of the word pair identifier 158, and an output 186 at which the unit portion information is provided. As noted above, the user-definable units identified by the unit portioner 156 may be a sentence, a paragraph, a page, a chapter, or any other user-definable unit. If for example, the unit is defined as a paragraph, break lines between paragraphs may be used to identify the units. The unit portioner 156 is realized on a microprocessor, a discreet circuit, or an ASIC.

The co-occurrence matrix generator 160 creates a co-occurrence matrix, C(X). As discussed above, the co-occurrence matrix, C(X) is created utilizing the search word list, Ω. In the co-occurrence matrix C(X), each search word $d_i$ is provided in a row and each search word $d_j$ is also provided in a column. For each search word pair $(d_i, d_j)$ identified by the word pair identifier 158, the number of units in which the search word pair $(d_i, d_j)$ is present are counted and recorded in the co-occurrence matrix as the search pair count $C_{i,j}(X)$. $C_{i,j}(X)$ represents, therefore, the number of unit word sets where the words $d_i$ and $d_j$ occur together in a unit and are both from the search word list Ω. The size of the co-occurrence matrix is, therefore, |Ω| by |Ω|. The co-occurrence matrix generator 160 has a first input connected to the output 186 of the unit portioner 156, a second input connected to the output 188 of the word pair identifier 158, and an output 190 at which appears the co-occurrence matrix. The co-occurrence matrix generator 160 is realized on a microprocessor, a discreet circuit, or an ASIC. It is understood that many of the entries in the co-occurrence matrix, $C_{i,j}(X)$, may be zero. Therefore, when storing the co-occurrence matrix on a computer, the size of the co-occurrence matrix may be greatly reduced by eliminating the zero entries from the co-occurrence matrix.

The word pair selector 162 of the device 150, selects a combination of the two words from the training word list, Ω, to provide a seed word-keyword pair. The word pair selector 162 has an input connected to the output 188 of the word pair identifier 158, and has an output 196 at which appears first and second vectors identifying the first and second words of the seed word-keyword pair. The word pair selector 162 is realized on a microprocessor, a discreet circuit, or an ASIC.

The probability matrix generator 164 of the device 150 generates a probability matrix as a function of the co-occurrence matrix. The probability matrix generator 164 has an input connected to the output 190 of the co-occurrence matrix generator 160 and an output 192 at which appears the probability matrix. The probability matrix generator 164 divides each entry in the co-occurrence matrix by the total number of the units of the first set or training set, X, to give the probability $P(d_i, d_j)$ of observing words $d_i$ and $d_j$ together in a unit. The probability matrix generator 164 divides the diagonal entries of the co-occurrence matrix by the number of units of the first set or training set, X, to give the probability $P(d_i)$ of observing the word $d_i$ in a unit, and divides this into $P(d_i, d_j)$ to give the probability $P(d_i|d_j)$ of observing word $d_i$ in a unit given that $d_j$ is in the unit. The results are stored in the probability matrix where the words of the search word list, Ω, represent the rows and columns of the probability matrix. The probability matrix generator 164 is realized on a microprocessor, a discreet circuit, or an ASIC.

The matrix normalizer 166 of the device 150 row-normalizes the probability matrix generated by the probability matrix generator 164 to form a transition matrix representing the transition probability. The matrix normalizer 166 includes a first input connected to the output 192 of the probability matrix 164 and an output 194 connected to the expected search distance calculator 168 and to the weighted average expected search distance generator 172. The transition matrix appears on the output 194. The matrix normalizer 166 sums each row in the probability matrix, divides each entry in the probability matrix in a particular row by the sum of that row, and stores the result in a corresponding location in the transition matrix. The matrix normalizer 166 is realized on a microprocessor, a discreet circuit, or an ASIC. The transition matrix entries represent the probability of transitioning from the word $d_i$ to the word $d_j$ in a single step; i.e. the transition probability. The transition probability reflects the probability, when randomly choosing from the units containing the word, $d_i$, that a unit having the word, $d_j$, will be chosen. The closer the relationship between the words $d_i$ and $d_j$, the greater the transition probability.

The expected search distance generator 168 determines an expected search distance for the seed word-keyword pair as a function of the probability matrix and the transition matrix, the first column vector, and the second column vector. The expected search distance generator 168 includes a user input 197 for receiving a user-definable value g, a second input in communication with the output 192 of probability matrix generator 164, a third input in communication with the output 194 of the matrix normalizer 166, a fourth input connected to the output 196 of the pair selector 162, a first output 198 at which appears the expected search distance for the seed word-key word pair, and has a second output 199 at which appears the second column vector. The expected search distance generator 168 is realized on a microprocessor, a discreet circuit, or an ASIC. The expected search distance generator 168 determines an expected search distance $\vec{c}_{d,k}$ as follows:

$$\vec{c}_{d,k} = \sum_{n=1}^{\infty} n[\vec{\Gamma}(d)]^T \cdot [(I - \vec{\Gamma}(k) \otimes \vec{\Gamma}(k)) \cdot R \cdot (I - \vec{\Gamma}(k) \otimes \vec{\Gamma}(k))]^{n-1} \cdot M \cdot \vec{\Gamma}(k)$$

$$\vec{c}_{d,k} = \sum_{n=1}^{\infty} n[\vec{\Gamma}(d)]^T \cdot \vec{\alpha}_n(k)$$

where $$\vec{\alpha}_1(k) = M \cdot \vec{\Gamma}(k)$$

$$\vec{\alpha}_n(k) = [(I - \vec{\Gamma}(k) x \vec{\Gamma}(k)) \cdot R \cdot (I - \vec{\Gamma}(k) x \vec{\Gamma}(k))] \cdot \vec{\alpha}_{n-1}(k)$$

for n≥2.

where d corresponds to the first word or seed word in the selected word pair, k corresponds to the second word or keyword in the selected word pair. As noted, above, the summation is limited by the value, g, which may be a user-defined value. $\vec{\Gamma}(d)$ is the first column vector that includes all zeros and one 1 for selecting values in the transition matrix related to the first word or seed word in the selected word pair, R is the transition matrix, $\vec{\Gamma}(k)$ is the second column vector that includes all zeros and one 1 for selecting values in the transition matrix related to the second word or keyword in the selected word pair, I is an identity matrix, and ⊗ is a tensor, or outer, product of two vectors.

The details of the expected search distance generator 168 are described below and illustrated in FIG. 10. The expected search distance, $\bar{c}_{d,k}$, for disjointed words will have a value that is very large (e.g., approaching infinity). The expected search distance, $\bar{c}_{d,k}$, for highly related words will have a very low value. In theory, the expected search distance requires an infinite summation. In practice, however, a few hundred transitions are sufficient before a useful precision of several decimal points is reached, the summation, therefore is limited by the user-defined value, g.

The device 150 of FIG. 9 also includes a calibrating vector generator 170 for generating a calibrating vector that consists of a normalized version of the diagonal entries of the co-occurrence matrix. The calibrating vector generator 170 has an input connected to the output 190 of the co-occurrence matrix generator 160, and has an output 195 at which appears the calibrating vector $\psi_i$. The calibrating vector $\psi_i$ is created as follows:

$$\psi_i = \frac{P(d_i)}{\sum_{d_j \in \Omega} P(d_j)} = \frac{C_{i,i}}{\sum_{ji} C_{j,j}}$$

The calibrating vector generator 170 is realized on a microprocessor, a discreet circuit, or an ASIC.

The device 150 also includes a weighted average expected search distance generator 172 for determining a weighted average expected search distance for the second or keyword in the selected word pair as a function of the transition matrix, the second column vector, and the third column vector. The weighted average expected search distance generator 172 has a first input connected to the output 199 of the expected search distance generator 168, has a second input connected to the output 194 of the matrix normalizer 166, a third input connected to the output 195 of the calibrating vector generator 170, the user-defined input 197 for receiving a user-definable value g, and an output 193 at which appears the weighted average expected search distance for the keyword of the selected seed word-keyword pair. The weighted average expected search distance generator 172 is realized on a microprocessor, a discreet circuit, or an ASIC. The weighted average expected search distance generator 172 determines a weighted average expected search distance as follows:

$$\bar{c}_k = \sum_{n=1}^{\infty} n [\vec{\psi}]^T \cdot \left[ (I - \vec{\Gamma}(k) \otimes \vec{\Gamma}(k)) \cdot R \cdot (I - \vec{\Gamma}(k) \otimes \vec{\Gamma}(k)) \right]^{n-1} \cdot M \cdot \vec{\Gamma}(k)$$

$$\bar{c}_k = \sum_{n=1}^{\infty} n [\vec{\psi}]^T \cdot \vec{\alpha}_n(k)$$

where k corresponds to the second or keyword in the selected word pair, g is a user-definable value, $\vec{\Psi}$ is the calibrating column vector consisting of a normalized version of the diagonal entries of the co occurrence matrix, $\vec{\Gamma}(k)$ is the second column vector that includes all zeros and one 1 for selecting values in the transition matrix related to the second word in the selected word pair, R is the transition matrix, I is an identity matrix, and ⊗ is a tensor, or outer, product of two vectors, and T indicates the transpose of the vector. The details of the weighted expected search distance generator 172 are described below and illustrated in FIG. 11.

The device 150 also includes calibrator 174 for determining the relevancy of the seed word of the selected word pair to the keyword in the selected word pair as the first output 198 of the expected search distance generator 168 divided by the output 193 of the weighted average expected search distance generator 172. The calibrator 174 has a first input connected to the first output 198 of the expected search distance generator 168, a second input connected to the output 193 of the weighted average expected search distance generator 172, and has an output 191 at which appears the word pair relevancy measure which provides the relevancy of the first word (seed word) in the selected word pair to the second word (keyword) in the selected word pair. It is noted that the smaller the word pair relevancy measure, the more relevancy there is between the first and second word of the selected word pair.

Figure 10:
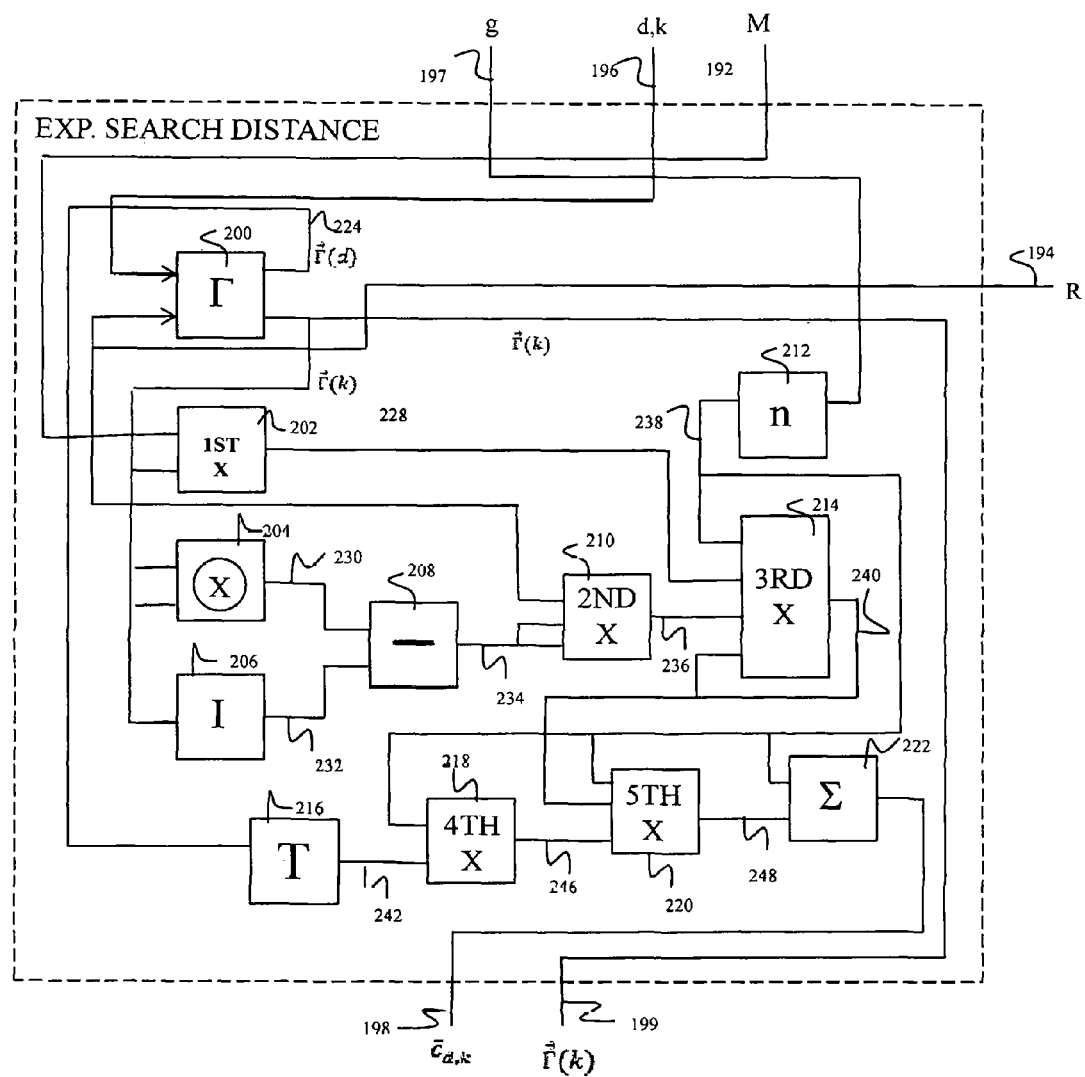
FIG. 10 illustrates the expected search distance generator of FIG. 9.

FIG. 10 provides a detailed block diagram of the expected search distance generator 168 of FIG. 9. The expected search distance generator 168 includes a column vector generator 200, a first multiplier 202, a dot product generator 204, an identity matrix generator 206, a subtractor 208, a second multiplier 210, an integer generator 212, a third multiplier 214, a transposer 216, a fourth multiplier 218, a fifth multiplier 220, and a summer 222.

The column vector generator 200 includes a first input in communication with the output 196 of the word pair selector 162 and a second input in communication with the output 194 of the matrix normalizer 166 for receiving the transition matrix R. The column vector generator 200 further includes a first output 224 on which the first column vector $\vec{\Gamma}(d)$ is provided. A second output of the column vector generator 200 provides the output 199 of the expected search distance generator 169. The second column vector $\vec{\Gamma}(k)$ is provided on the output 199.

The first multiplier 202 of the expected search distance generator 168 includes a first input connected to the output 192 of the probability matrix generator 164, a second input in communication with the second output 199 of the column vector generator 200, and an output 228. The first input receives the probability matrix M and the second input receives the second column vector. The output 228 provides the product of the probability matrix M and the second column vector $\vec{\Gamma}(k)$.

The dot product generator 204 of the expected search distance generator 168 includes two inputs in communication with output 199 of the column vector generator. The dot product generator 204 includes an output 230 at which the dot product of second column vector $\vec{\Gamma}(k)$ with itself appears.

The expected search distance generator 168 also includes an identity matrix generator 206. The identity matrix generator 206 includes an input in communication with the output 194 of the matrix normalizer 166 and an output 232 at which appears an identity matrix (i.e., a matrix that has ones on its diagonal and zeros everywhere else). The identify matrix is equivalent in size to the transition matrix received at the input of the identify matrix generator 206.

The subtractor 208 of the expected search distance generator 168 includes a first input connected to the output 230 of the dot product generator 204, a second input connected to the output 232 of the identity matrix generator 206, and an output 234 at which appears the difference between the identity matrix and the dot product of the second column vector $\vec{\Gamma}(k)$ and itself.

The second multiplier 210 of the expected search distance generator 168 includes a first input which receives the transition matrix, R and second and third inputs in communication with the output of the subtractor 208. The second multiplier 210 further includes an output 236 on which appear the product of the three inputs to the second multiplier 210.

The integer generator 212 of the expected search distance generator 168 includes an input in communication with the input 197 for receiving a user-definable value g and an output 238 at which appears the value g and n integers, where the integers range from 1 to g.

The third multiplier 214 of the expected search distance generator 168 includes a first input connected to the output 238 of the integer generator 212, a second input connected to the output 228 of the first multiplier 282, a third input connected to the output 236 of the second multiplier 210, and a fourth input at which the output of the third multiplier 214 is fed back to the third multiplier 214. The third multiplier 214 further includes an output 240 at which appears $$\vec{\alpha}_1(k) = M \cdot \vec{\Gamma}(k)$$

and $$\vec{\alpha}_n(k) = [(I - \vec{\Gamma}(k) x \vec{\Gamma}(k)) \cdot R \cdot (I - \vec{\Gamma}(k) x \vec{\Gamma}(k))] \cdot \vec{\alpha}_{n-1}(k),$$

for n≥2.

The transposer 216 of the expected search distance generator 168 includes a first input connected to the first output 224 of the column vector generator 200, a second input connected to the output 194 of the matrix normalizer 166, and an output at which appears the transposed first column vector $\vec{\Gamma}(d)$.

The fourth multiplier 218 of the expected search distance generator 168 includes a first input in communication with the output 238 of the integer generator 212, a second input in communication with the output 242 of the transposer 216, and an output 246 at which appears the product of the transposed first column vector $\vec{\Gamma}(d)$ and the values n, where the values n are the integers from 1 to g.

The fifth multiplier 220 of the expected search distance generator 168 includes a first input in communication with the output 238 of the integer generator 212, a second input in communication with the output 246 of the fourth multiplier 218, and a third input in communication with the output 240 of the third multiplier 214. The fifth multiplier further includes an output 248 at which appears the products of the output 240 of the third multiplier 214 and the output 246 of the fourth multiplier 218 for the values n, where the values n are the integers from 1 to g.

The summation block 222 of the expected search distance generator 168 includes a first input in communication with the output 238 of the integer generator 212, a second input in communication with the output 248 of the fifth multiplier 220. The summation block 222 also includes an output in communication with the output 198 of the expected search distance generator 168 at which appears the expected search distance as follows:

$$\bar{c}_{d,k} = \Sigma_{n=1} g_n [\vec{\Gamma}(d)]^T \cdot \vec{\alpha}_n(k).$$

Figure 11:
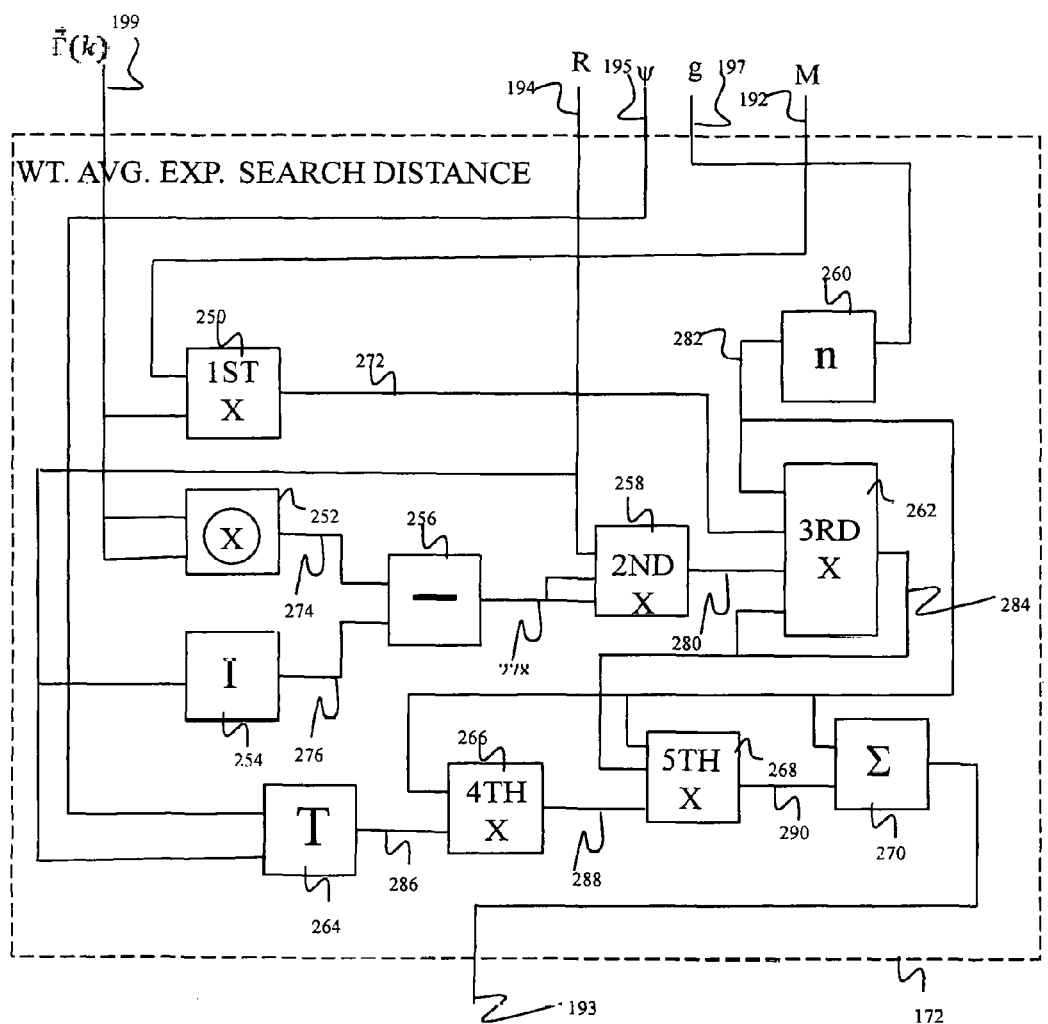
FIG. 11 illustrates the weighted average expected search distance generator of FIG. 9.

FIG. 11 provides a detailed block diagram of the weighted average expected search distance generator 172 of FIG. 9. The weighted average expected search distance generator 172 generally includes a first multiplier 250, a dot product generator 252, an identity matrix generator 254, a subtractor 256, a second multiplier 258, an integer generator 260, a third multiplier 262, a transposer 264, a fourth multiplier 266, a firth multiplier 268, and a summation bock 270.

The first multiplier 250 generally includes a first input, a second input and an output 272. The first input is in communication with the output 199 of the expected search distance generator 168 on which the second column vector $\vec{\Gamma}(k)$ is provided. The second input is in communication with the output 192 of the probability matrix generator 164 on which the probability matrix, M, is provided. The output 272 of the first multiplier provides the product of the probability matrix and the second column vector $\vec{\Gamma}(k)$.

The dot product generator 252 includes first and second inputs and an output 274. The first and second inputs are in communication with the output 199 of the expected search distance generator 168 on which the second column vector r (k) is provided. The dot product of second column vector $\vec{\Gamma}(k)$ with itself is provided on the output 274.

The identity matrix 254 includes an input in communication with the output 194 of the matrix normalizer 166 and an output 276 at which appears an identity matrix (i.e., a matrix that has ones on its diagonal and zeros everywhere else) which is the size of the transition matrix received at its first input.

The subtractor 256 includes first and second inputs and an output 278. The first input is in communication with the output 274 of the dot product generator 252 and the second input is in communication with the output 276 of the identity matrix generator 254. The output 278 provides the difference between the identity matrix and the dot product of the second column vector $\vec{\Gamma}(k)$ and itself.

The second multiplier 258 includes first, second and third inputs and an output 280. The first input is in communication with the output 194 of the matrix normalize. The second and third inputs are in communication with the output 278 of the subtractor 256. The product of the first, second, and third inputs is provided on the output 280 of the second multiplier 258.

The integer generator 260 includes an input in communication with the user-defined input 197 for receiving a user-definable value g and an output 282 at which appears the value g and n integers, n, where the integers range from 1 to g.

The third multiplier 262 includes first, second, third and fourth inputs and an output 284. The first input is in communication with the output 282 of the integer generator 260. The second input is in communication with the output 272 of the first multiplier 250. The third input is in communication with the output 280 of the second multiplier 258. The fourth input is fed back from the output 284 of the third multiplier 262. The output 284 provides the following products:

$$\vec{\alpha}_1(k) = M \cdot \vec{\Gamma}(k),$$

for $n=1$, and $$\vec{\alpha}_n(k) = [(I - \vec{\Gamma}(k)x\vec{\Gamma}(k)) \cdot R \cdot (I - \vec{\Gamma}(k)x\vec{\Gamma}(k))] \cdot \vec{\alpha}_{n-1}(k)$$

for $n \geq 2$.

The transposer 264 includes a first input in communication with the output 195 of the third column vector generator 170 and a second input in communication with the output 194 of the matrix normalizer 166 on which normalized transition matrix R is provided. The transposer 264 further includes an output 286 at which appears the calibrating column vector transposed.

The fourth multiplier 266 includes a first input in communication with the output 282 of the integer generator 260, a second input in communication with the output 286 of the transposer 264, and has an output 288 at which appears the products of the transposed third column vector $\vec{\Psi}$ and n integers, where the integers range from 1 to g.

The fifth multiplier 268 includes a first input in communication with the output 282 of the integer generator 260, a second input in communication with the output 284 of the third multiplier 262, and a third input in communication with the output 288 of the fourth multiplier 266. The fifth multiplier 268 further includes an output 290 at which appears the products of the corresponding outputs of the integer generator 260, the third multiplier 262 and the fourth multiplier 266 for the values n, where the values n are the integers from 1 to g.

The summation block 270 includes a first input in communication with the output 282 of the integer generator 260 and a second input in communication with the output 290 of the fifth multiplier 268. The summation block 270 further includes an output which provides the output 193 of the weighted average expected search distance generator 172 at which appears the weighted average expected search distance as follows:

$$\tilde{c}_k = \sum_{n=1}^{\infty} n[\vec{\psi}]^T \cdot \vec{\alpha}_n(k)$$

A word pair relevancy measure is provided by the method 100 of FIG. 2 and by the device 150 of FIG. 9. Examples of word pair relevancy measures utilizing the method 100 and the device 150 are provided in Tables 1 and 2. The training set used in connection with the examples of Tables 1 and 2 was the Mar. 14, 2012 version of the English Wikipedia. The unit text size was a paragraph as defined by the Wikipedia xml schema.

TABLE 1

Word pair relevancy measures, $s_{d,k}$ for pairs of words, means, μ, and standard deviation, σ. g = 100 steps was used.

|  | there | it | is | or | them | this | then | μ | σ |
|---|---|---|---|---|---|---|---|---|---|
| Agriculture | 1.007 | 1.005 | 1.005 | 1.002 | 1.008 | 1.007 | 1.008 | 1.006 | 0.0020 |
| Automobile | 1.006 | 1.005 | 1.005 | 1.006 | 1.006 | 1.006 | 1.006 | 1.006 | 0.0004 |
| Ford | 1.013 | 1.013 | 1.014 | 1.014 | 1.013 | 1.013 | 1.013 | 1.013 | 0.0004 |

Table 1 provides the word pair relevancy measure, $s_{d,k}$, with the first words (seed words) provided in the columns and the second words (keywords) on the left. As noted above, the smaller the value provided for the word pair relevancy measure, the more significant the relationship between the keyword, k, and the search word, d. Disjointed words, on the other hand, will have a measure near infinity. It is noted that each of the first words (search words) provided in Table 1 are "common words", i.e. words that have no particular relevancy to the keywords, k.

As noted above, the word pair relevancy measure does not utilize the expected search distance directly, but rather utilizes the ratio of the expected search distance from a seed word to the keyword relative to the weighted average expected search distance of the keyword (averaged over all possible seed words). As a result, a word that is neutrally relevant to all words will have a word pair relevancy measure near 1 with all words, and a word that is perfectly correlated with a keyword will have a measurement of $(1/\tilde{c}_k)$ where $\tilde{c}_k$ is the weighted average expected search distance from all possible search words to the keyword, k. For each of the search words provided in Table 1, the word pair relevancy measures are very near one (1) indicating that each of the search words is neutrally relevant with respect to each of the keywords.

TABLE 2

Word pair relevancy measures, $s_{d,k}$, for pairs of words, using N = 100 steps.

|  | the | and | agriculture | automobile | ford | car | tractor | food |
|---|---|---|---|---|---|---|---|---|
| agriculture | 1.007 | 1.005 | 0.010 | 0.995 | 1.005 | 1.007 | 0.926 | 0.985 |
| automobile | 1.005 | 1.005 | 0.994 | 0.010 | 0.974 | 0.981 | 0.804 | 1.005 |
| Ford | 1.013 | 1.012 | 1.005 | 0.943 | 0.010 | 0.954 | 1.004 | 1.013 |

Table 2 provides word pair relevancy measures, $s_{d,k}$, with the words on the left as the key words, k, and the seed words, d, provided in the columns. The smaller the value of the measure provided in the table, the more significant the relationship between the keyword, k, and the seed word, d. The seed words selected in Table 2 include words in addition to the common words "the" and "and". The common seed words are associated with word pair relevancy measures very near 1. In contrast however, the remaining seed words have smaller word pair relevancy measures if the seed word is relevant to the keyword.

It is noted that the word pair relevancy measure, $s_{d,k}$, is a relative measure, and not an absolute measure. Therefore, word pair relevancy measurements from different keywords, $k_1$ and $k_2$, cannot be compared directly. As a result, an understanding of the difference between two relevancy measurements $s_{d,k1}$ and $s_{d,k2}$ is not intuitive. As discussed below, in some instances, the ability to gauge the significance of a particular relevancy measure to multiple keywords is desired. The present invention, therefore, provides a normalized word pair relevancy measure to allow the significance of the word pair relevancy measures to multiple keywords to be easily understood.

Figure 12:
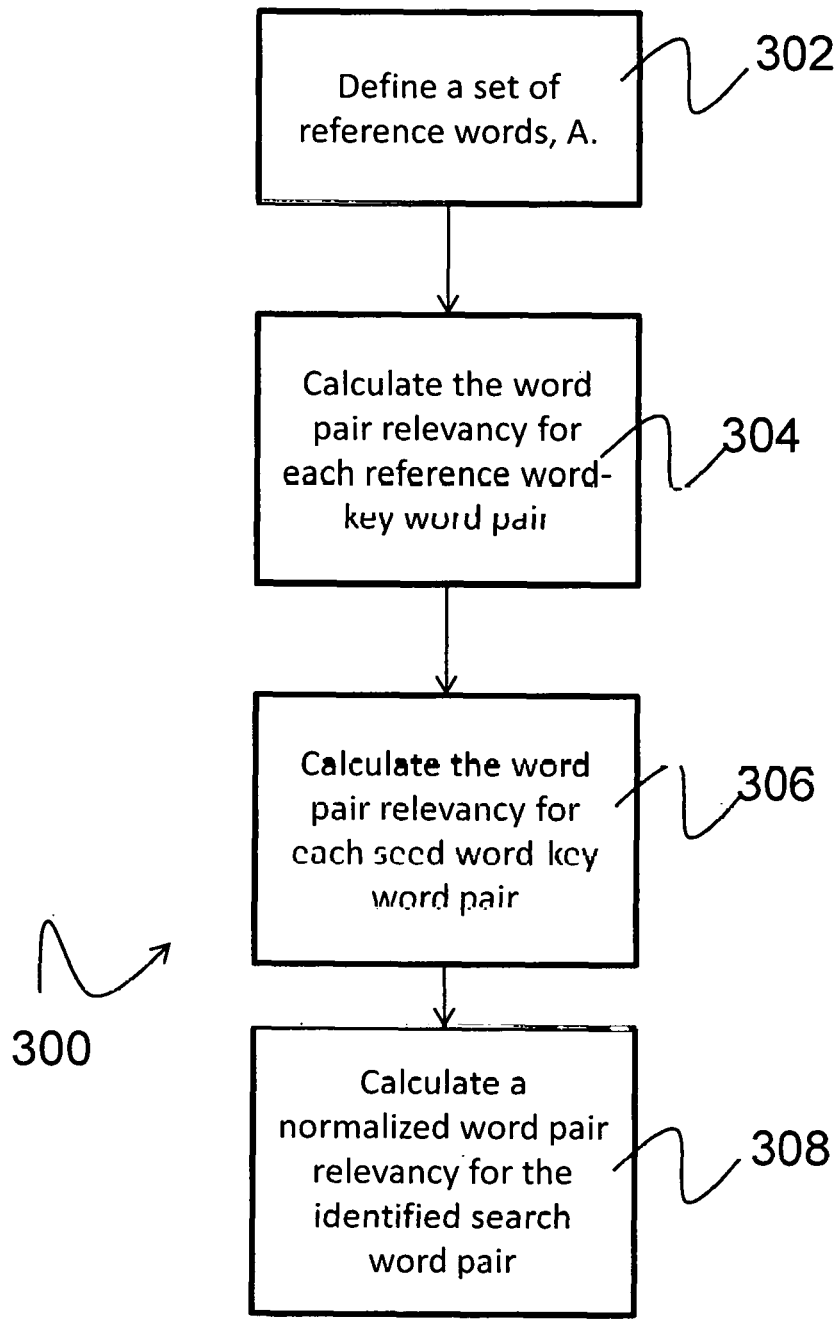
FIG. 12 illustrates a method of determining a normalized word pair relevancy.

The method for determining the normalized word pair relevancy measure is illustrated in FIG. 12. As illustrated in FIG. 12, the process 300 for determining the normalized word pair relevancy begins at step 302 by defining a set of reference words A. For example, the reference words may be the set of "common" words, such as "the", "a", "that", "there", etc. Alternatively, for example, the set of reference words may be the ten most common words of the set. The set, A, of reference words includes words which are anticipated to have no connection to most or all of the search terms. More specifically, the set A of reference words includes words which are not relevant (i.e. have no significance) to either of the keywords, $k_1$ or $k_2$, to be compared.

Having defined the set A at step 302, the word pair relevancy for each reference word-keyword pair (or "reference word pair") is calculated at step 304 in accordance with the method 100 described in FIG. 2. The word pair relevancy for each reference word-keyword pair is identified as $s_{a,k}$.

Next, at step 306 the word pair relevancy for the seed word-keyword pair $s_{d,k}$, is calculated in accordance with the method 100 described in FIG. 2;

Next, at step 308 the normalized word pair relevancy measure, $s'_{d,k}$, is calculated for the identified seed word-keyword pair. An example for calculating the normalized word pair relevancy measure $s'_{d,k}$ is:

$$s'_{d,k} = \frac{s_{d,k} - \mu_k(A)}{\sigma_k(A)}$$

where $$\mu_k(A) = \frac{1}{|A|} \sum_{a \in A} s_{a,k}$$

and $$\sigma_k(A) = \sqrt{\left(\frac{1}{|A|} \sum_{a \in A} s_{a,k}^2\right) - \left(\frac{1}{|A|} \sum_{a \in A} s_{a,k}\right)^2}$$

Figure 13:
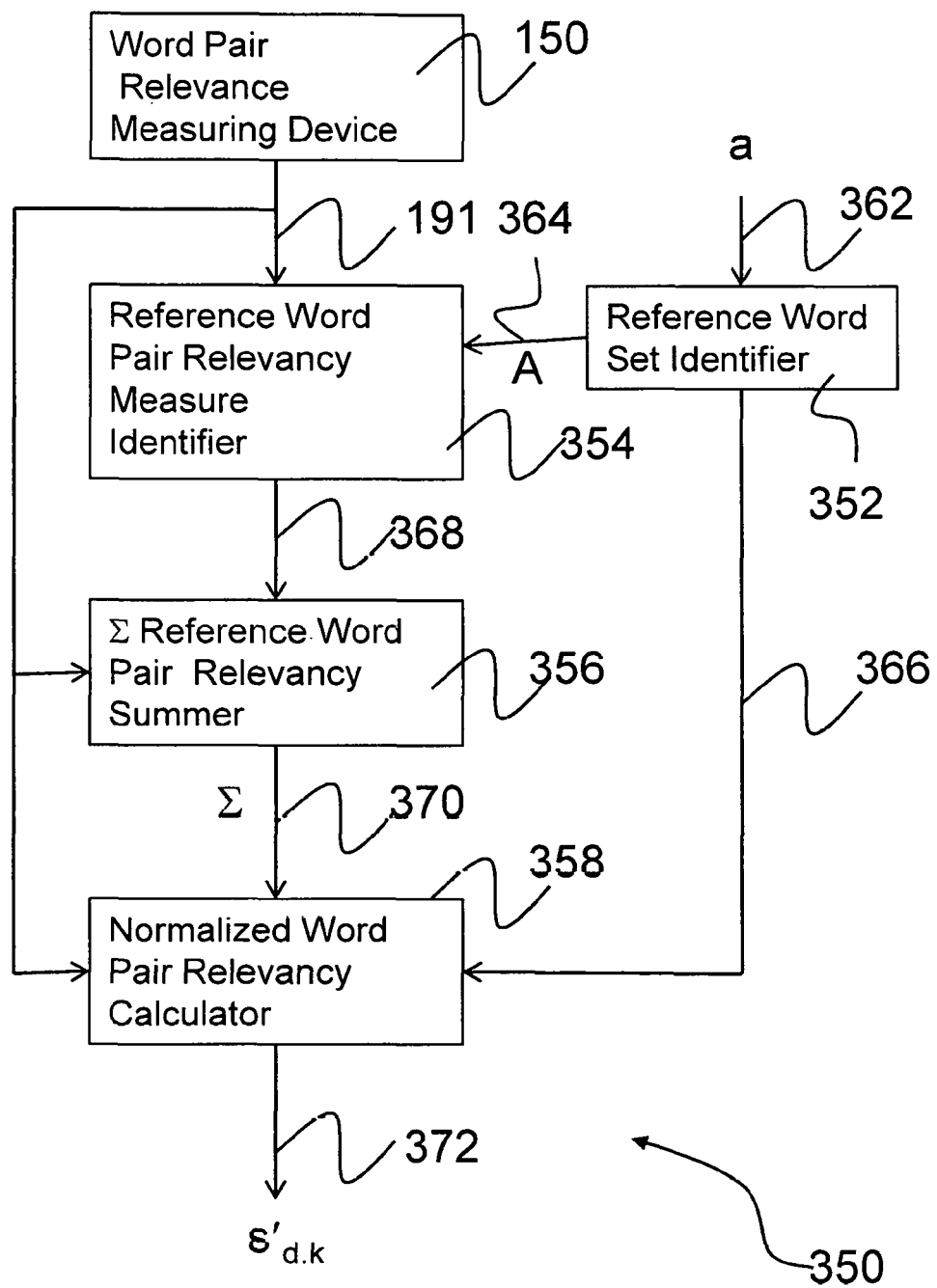
FIG. 13 illustrates a device for determining normalized word pair relevancy.

A device for determining the normalized word pair relevancy measure is illustrated in FIG. 13. The device 350 generally includes, the word pair relevancy measuring device 150, a reference word set identifier 352, a reference word pair relevancy identifier 354, a reference word pair summer 356, and a normalized word pair relevancy calculator 358. The word pair relevancy measure 150 is discussed in detail with respect to FIG. 9

The reference word set identifier 352 includes an input 362 which receives the reference words, a, to define a set of reference words A. A first output 364 of the identifier 352 identifies the reference words, a, and a second output 366 identifies the magnitude of the set A.

The reference word pair relevancy identifier 354 includes a first input which receives the output 191 of the word pair relevancy measuring device 150 on which the word pair relevancy measure $S_{d,k}$ is provided. A second input of the identifier 354 is in communication with the output 364 of the reference word set identifier 352. An output 368 of the reference word pair relevancy identifier 354 provides a word pair relevancy measure $s_{a,k}$ for each reference word, a.

The reference word pair summer 356 includes a first input in communication with the output 368 of the identifier 354 and an output 370. The output 370 provides the sum of the word pair relevancy measures $S_{a,k}$ for each reference word, a, in the set A.

The normalized word pair relevancy calculator 358 includes a first input connected to the output 191 of the word pair relevancy measure 150, a second input connected to the output 370 of the word pair relevancy summer 356, a third input connected to the output 366 of the reference word set identifier 352, and an output 372. The output 372 of the normalized word pair relevancy calculator provides a normalized word pair relevancy measure, $s'_{d,k}$, for the seed word-keyword pair (d,k).

The normalized word pair relevancy measure as described above utilizes a standard statistical normalization method. It is to be understood, however, that different methods may be utilized for providing a normalized relevancy measure. For example, a Bayesian regression may be used to calculate a normalized relevancy measure, $s'_{d,k}$.

TABLE 3

Normalized word pair relevancy measures, $s'_{d,k}$ for pairs of words.

|  | the | and | agriculture | automobile | ford | car | tractor | food |
|---|---|---|---|---|---|---|---|---|
| Agriculture | 0.59 | −0.47 | −494 | −5.48 | −0.56 | 0.38 | −39 | −10 |
| Automobile | −0.75 | −1.27 | −29 | −2603 | −85 | −63 | −527 | −0.65 |
| Ford | −0.84 | −1.70 | −19 | −157 | −2240 | −133 | −20 | 0.15 |

Table 3 provides the normalized word pair relevancy measure, $s'_{d,k}$, for the same search words and keywords included in Table 2. These normalized calculations allow for a direct comparison of the normalized word pair relevancy measures for different keywords; i.e., the measurements provided in Table 3 indicate that the seed word "agriculture" is less relevant to the keyword "automobile" than the seed word "ford" is to the keyword "automobile".

The word pair relevancy measures in Table 1 and 2 can be used to effectively rank the relevancy of seed words to a particular keyword, but only the normalized word pair relevancy measures of Table 3 can be compared across keywords. For example, using Table 2, it would appear that the relevancy of "agriculture" to itself is as strong as "automobile" to itself. However, Table 3 suggests that finding a document with the word "automobile" when the keyword is "automobile" is much more significant than finding a document with the word "agriculture" when the keyword is "agriculture." This is an artifact of the word "agriculture" being more common in the training set than the word "automobile," and this successfully mimics a human's intuition which would take into account the rarity of a keyword when judging the significance of finding documents with that keyword. Tables 2 and 3 together provide confidence with respect to the normalized word pair measurement.

$s'_{d,k}(A)$, therefore, represents the number of standard deviations $s_{d,k}$ is from the mean of measures to the reference words. A rule of thumb is that pairs of words with measures $s' \leq -3$ are potentially relevant to each other, and words with measures $s' \leq -6$ are likely relevant to each other.

A notable drawback of this normalized word pair relevancy measure is that it requires a user to define the set of reference words A. It is noted, however, that the set A of reference words can be defined automatically without requiring user input by utilizing an automated method.

To further illustrate how the normalized word pair relevancy measure can be used to mimic the intuition that would be employed by a person, consider the following example of determining the relevancy of the names of four countries to a list of former heads of state and names of provinces from these countries. The list of the former heads of state along with the normalized word pair relevancy measure, $s'_{d,k}$ for each is given in Table 4. The list has been sorted in accordance with the normalized word pair relevancy measures. In calculating the normalized word pair relevancy measure, $s'_{d,k}$, set A was defined as including the common words either, or, not, only, but, also, neither, nor, both, and, whether, just, as, so, of, to, in, for, on, that, there, the, a, an, thee, whence, was, with, if, at, from, among, within.

TABLE 4

Ranked normalized word pair relevancy measures for the words in the set {Putin, Medvedev, Novgorod, Samara, Sarkozy, Brittany, Normandy, Mitterrand, Zedillo, Oaxaca, Veracruz, Fox, Hunan, Beijing, Jiang, Hu} to the keywords {Russia, France, Mexico, China} using the common words in A, N = 100 steps, and English Wikipedia as the training set.

| Russia $s'_{d,russia}$ | | France $s'_{d,france}$ | | Mexico $s'_{d,mexico}$ | | China $s'_{d,china}$ | |
|---|---|---|---|---|---|---|---|
| Putin | (−103) | Sarkozy | (−74) | Zedillo | (−225) | Hunan | (−121) |
| Medvedev | (−91) | Brittany | (−62) | Oaxaca | (−224) | Beijing | (−99) |
| Novgorod | (−45) | Normandy | (−58) | Veracruz | (−200) | Jiang | (−59) |
| Samara | (−43) | Mitterrand | (−44) | Fox | (−20) | Hu | (−29) |
| Fox | (−10) | Fox | (−9) | Sarkozy | (−4) | Fox | (−12) |
| Sarkozy | (−4) | Hu | (−1) | Hu | (−1) | Sarkozy | (−6) |
| Beijing | (0) | Medvedev | (0) | Jiang | (2) | Medvedev | (−3) |
| . | | . | | . | | . | |
| . | | . | | . | | . | |
| . | | . | | . | | . | |

In each column, the four terms in the list that are related to their keyword country appear much more relevant than the other words, where lower scores imply stronger relevancy. For example, the normalized word pair relevancy measures provided in Table 4 indicate that the relevancy measurement for the word pair (France, Sarkozy) is more significant than the relevancy measurement for the word pair (France, Fox). As will be discussed below, the word pair relevancy measures provided by the present invention are utilized to rank the relevancy of documents to a keyword(s). Thus, someone querying for documents related to France, for example, would have documents ranked near the top if they discussed Sarkozy's presidency, even without the documents ever explicitly mentioning France. It is worth taking note of how Fox scored. The term "fox" is an ambiguous term because "fox" could refer to the former Mexican president Vicente Fox or to a small animal. The term "fox" scores highly with respect to Mexico, but less highly than terms that are unambiguously connected to Mexico. It also scores somewhat highly with respect to the other countries, which all have the small animals in them, but much less highly than it does with Mexico. This is exactly the behavior that is desired.

RANKING DOCUMENTS IN THE LIVE SET

When the live set (i.e. a collection of live documents) is provided to a searcher and the searcher is tasked with finding information relevant to a particular keyword from these live documents, the searcher needs the ability to locate and rank the potentially relevant live documents. The present invention utilizes the word pair relevancy calculations or the normalized word pair relevancy calculations provided by the training documents to determine the relevancy of a live document to a particular keyword. Specifically, each word in the live document is identified as a seed word, d, and each seed word, d, is paired with the keyword, k to provide seed word-keyword pairs (d,k). The calibrated word pair relevancy or normalized word pair relevancy for each seed word-keyword pair associated with the document is then utilized to provide a document relevancy measure as will be discussed herein. This relevancy determination is then utilized to provide a ranking of the documents in the live set. Thus, the notion of relevancy derived for the search word pairs of the training set is expanded to a notion of relevancy of documents from a live set of documents.

The invention provides several options, of varying rigor, for finding a measure of relevancy between a keyword, k, and a live set document, D.

Figure 14:
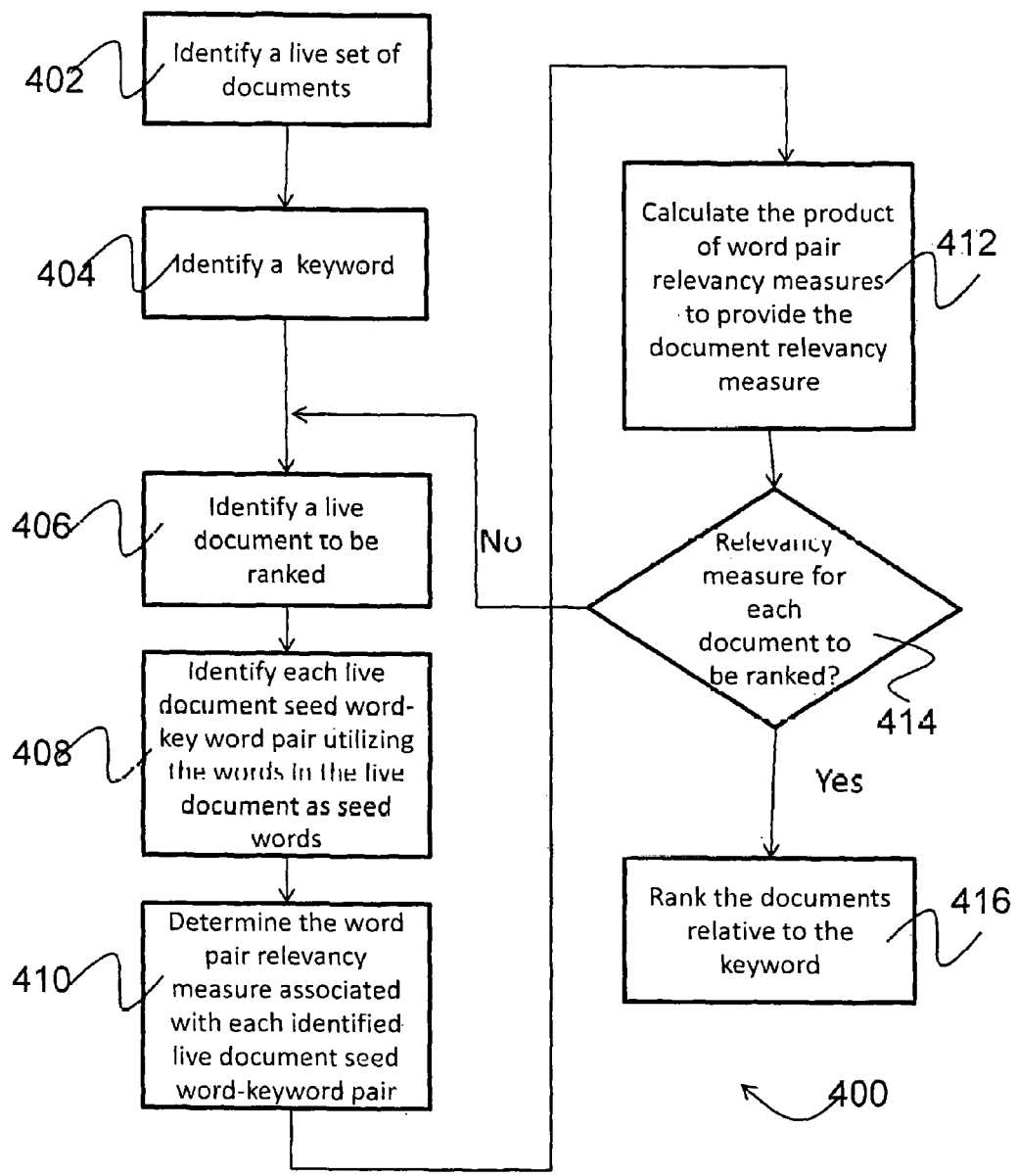
FIG. 14 illustrates a method of ranking documents of a live set utilizing word pair relevancy.

A first and relatively simple method 400 for ranking live documents relative to a keyword is illustrated in FIG. 14. The process begins at step 402 by identifying the documents of the live set to be ranked. Next, at step 404 a keyword is identified and at step 406 a particular document to be ranked is identified. At step 408, the live document word pairs are identified, wherein each word in the document is utilized as a seed word, d, and paired with the selected keyword, k, to provide a plurality of live document seed word-keyword pairs (d, k) associated with the live document. Next, at step 410, the word pair relevancy measures associated with each identified live document seed word-keyword pair (d, k) is determined. For example, the word pair relevancy measure described in connection with FIG. 2, may be utilized for determining the word pair relevancy measure for each live document seed word-keyword pair. Next, at step 412, the product of the word pair relevancy measures is calculated to provide the document relevancy measure. The document relevancy measure can be expressed as:

$$S(D\sim k) = \Pi_{d \in D} s_{d,k}$$

D represents the set of words d in the document D, with duplicates. The product of all word pair relevancy measures, $s_{d,k}$, for each live document seed word-keyword pair (d,k) (or "live document word pair") associated with the document D provides the document relevancy of D to the keyword k, $S(D\sim k)$, i.e. the document relevancy measure. Since reference words are neutrally correlated to the keyword, reference words tend to have a word pair relevancy measurement near 1 and the product of measurements for individual seed word-keyword pairs (live document word pairs) can be used to score a document without the document words that are neutrally correlated to the keyword(s) having much effect on the final outcome.

At step 414 it is determined whether the relevancy measure for each document to be ranked has been calculated. If additional document relevancy measurements are to be determined, the process returns to step 406. If at step 414 it is determined that a document relevancy measurement has been determined for each document to be ranked, the process proceeds to step 416.

At step 416 the document relevancy measures are utilized to rank the relevancy of the live documents relative to the keyword.

Figure 17:
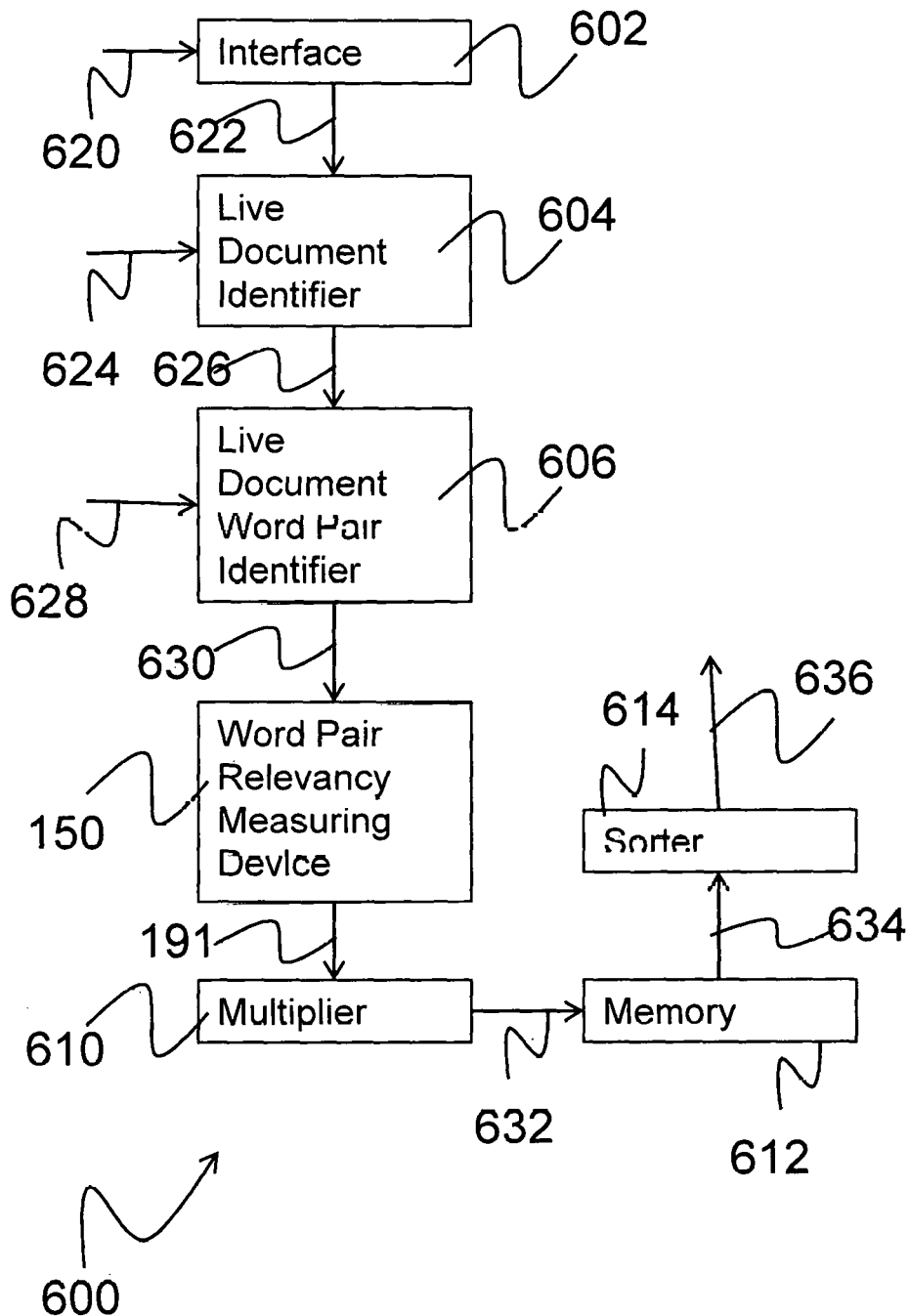
FIG. 17 illustrates a device for ranking documents of a live set utilizing word pair relevancy measures.

A device for ranking documents based upon document relevancy measure is illustrated in FIG. 17. The device 600 generally includes an interface 602, a live document identifier 604, a live document word pair identifier 606, a word pair relevancy measurer 150, a document relevancy calculator 610, a memory 612, and a sorter 614.

The interface 602 retrieves information regarding the live documents to be ranked. The interface 602 includes an input 620 on which information regarding the live documents is received and an output 622 on which information regarding the live documents is provided to the device 600.

The live document identifier 604 includes a first input in communication with the output 622 of the interface 602 and a second input 624 from which the user may identify a live document to be ranked. The identifier 604 further includes an output 626 on which information regarding the live document is provided.

The live document word pair identifier 606 includes a first input in communication with the output 626 of the live document identifier 604 and a second input 628 from which a user may define a keyword, k. The live document word pair identifier further includes an output 630 on which the identified live document seed word-keyword pairs (d,k) are provided.

The word pair relevancy measurer 150 includes an input in communication with the output 630 of the live document word pair identifier 606 and an output 191. The word pair relevancy measurer 150 is described in detail in connection with FIG. 9. The identified live document seed word-keyword pairs are provided to the word pair relevancy measurer 150 and the word pair measurer 150 provides the word pair relevancy measure for each of the live document seed word-keyword pairs for the identified document on the output 191.

The document relevancy calculator 610 is provided by a multiplier. The multiplier 610 includes an input in communication with the output 191 and an output 632. The multiplier multiplies the word pair relevancy measures of the live document seed word-keyword pairs and provides the product as the document relevancy measure on the output 632.

The memory 612 includes an input in communication with the output 632 of the multiplier 610 and an output 634. The memory stores the product provided by the multiplier for each live document identified by the live document identifier 604.

The sorter 616 includes an input in communication with the memory 612 and an output 636. The sorter 616 receives the document relevancy measures from the memory 612 and sorts the measures to provide a ranking of the document relevancy measures on the output 636.

The document relevancy measure provided by the method 400 and the device 600 is beneficial because it can be computed quickly, it reasonably mimics a human's ranking of relevancy, and it does not require a set of reference words A to be defined or an additional set of documents, Δ, that will be required for greater rigor (as will be discussed below). Upon calculating the document relevancy measure, $S(D\sim k)$ for each document, the documents are ranked in accordance with the document relevancy measures. An example of utilizing the document relevancy measure provided above to rank documents of interest to a searcher was conducted. The keyword searched was "cosmology". The set of documents, D, included all of the Reuters articles from Mar. 28, 2012. Using a Boolean keyword search, no results were returned to the searcher because the word cosmology did not appear in any of the articles that day. However, when ranking the news articles utilizing the document relevancy calculation, $S(D\sim k)$, provided above, an article about the astronomy of exoplanets was ranked highest. This article was clearly relevant to cosmology, and would probably be of interest to many readers who were particularly interested in cosmology, even though the article was not strictly about the origin and fate of the universe.

Similarly, a ranking of the relevancy of documents to the keyword NAFTA (North American Free Trade Agreement) provided the highest ranking to an article about a Mexican presidential candidate, even though the article did not contain the term NAFTA. These examples illustrate that document relevancy calculations and rankings provided by the present invention are particularly useful when Boolean searches fail (e.g. when the keyword is not present in the relevant document).

Although the document relevancy measure $S(D\sim k)$ provided above can be used to properly rank documents from a single language based on a single keyword, it is difficult to directly generalize rankings that involve multiple keywords, because each relevancy measure is made from a unique reference point. When a set of reference or irrelevant words A is available, however, a ranking relative to multiple keywords can be accomplished utilizing the normalized word pair relevancy measure discussed above.

Figure 15:
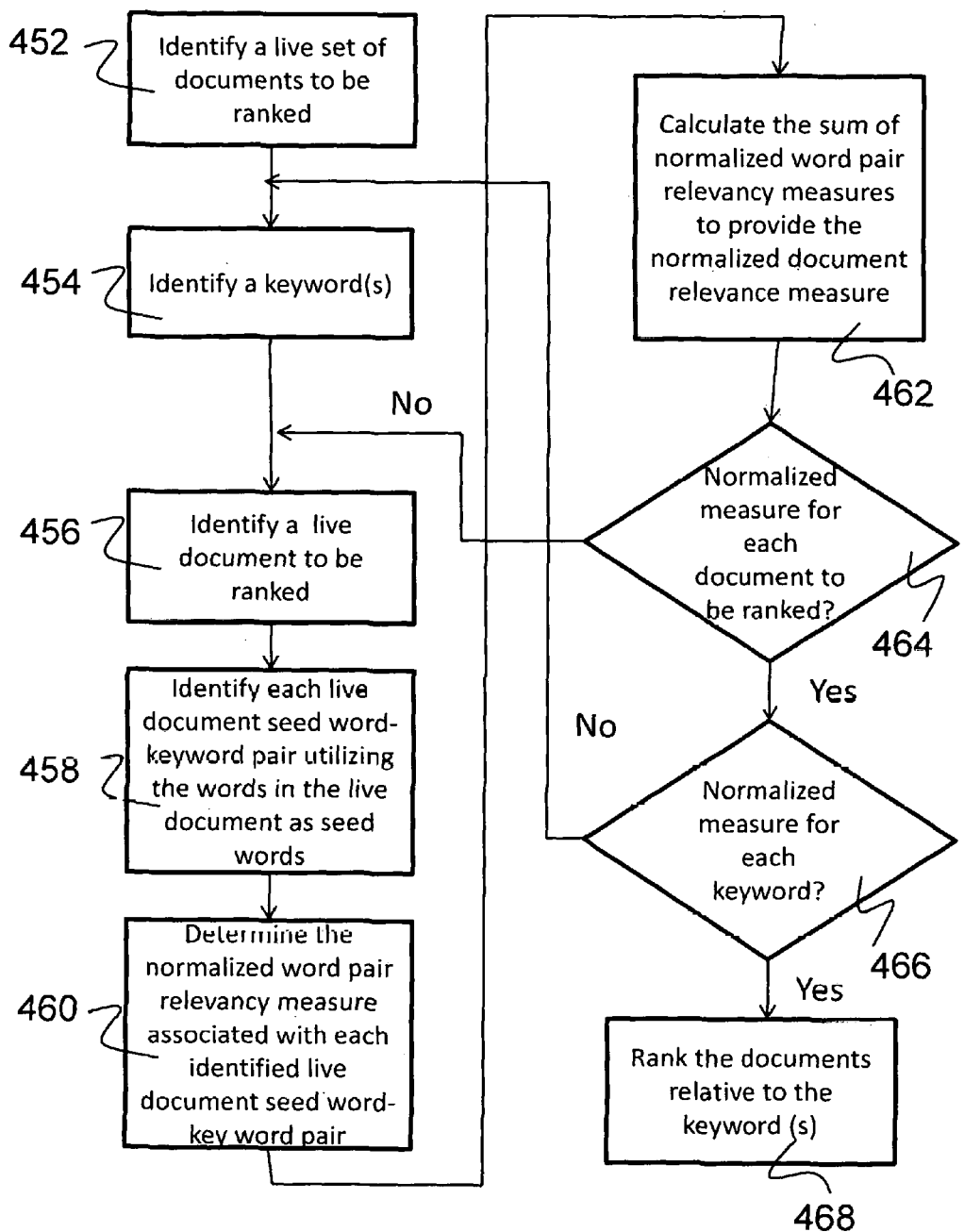
FIG. 15 illustrates a method of ranking documents of a live set utilizing normalized word pair relevancy measures.

The method 450 of ranking documents relative to a keyword(s) utilizing a normalized document relevancy measurement is illustrated in FIG. 15. The process begins at step 452 by identifying the documents of the live set to be ranked. Next, at step 454 a keyword is identified and at step 456 a particular document, D, to be ranked is identified. At step 458, the live document seed word-keyword pairs are identified utilizing each word d, of the document, D, as a seed word. Each seed word is paired with the selected keyword to provide a live document seed word-keyword pairs.

Next, at step 460, the normalized word pair relevancy measure, $s'_{d,k}$, associated with each identified live document seed word-keyword pair (d, k) is calculated utilizing the normalized word pair relevancy calculation discussed above in connection with FIG. 4.

Next, at step 462, the sum of the normalized word pair relevancy measures is calculated to provide the normalized document relevancy measure. The normalized document relevancy measure, S(D~k|A), is calculated as follows:

$$S(D\sim k|A) = \Sigma_{d \in D} s'_{d,k}.$$

D represents the set of words d in the live document D, with duplicates. The sum of all normalized word pair relevancy measures, $s'_{d,k}$, for each word d, provides the relevancy of D to the keyword k, S(D~k|A), i.e. the normalized document relevancy measure.

At step 464 an inquiry is made as to whether a normalized document relevancy measure has been calculated for each document of the live set to be ranked. Once all of the normalized relevancy measures have been calculated for the keyword identified, at step 466 an inquiry is made as to whether the relevancy of documents to additional keywords is to be determined. If additional normalized document relevancy measures are to be made for additional keywords, the process returns to step 456. Once the relevancy of documents to all keywords has been determined, at step 468, the documents are ranked relative to the keyword(s).

Figure 18:
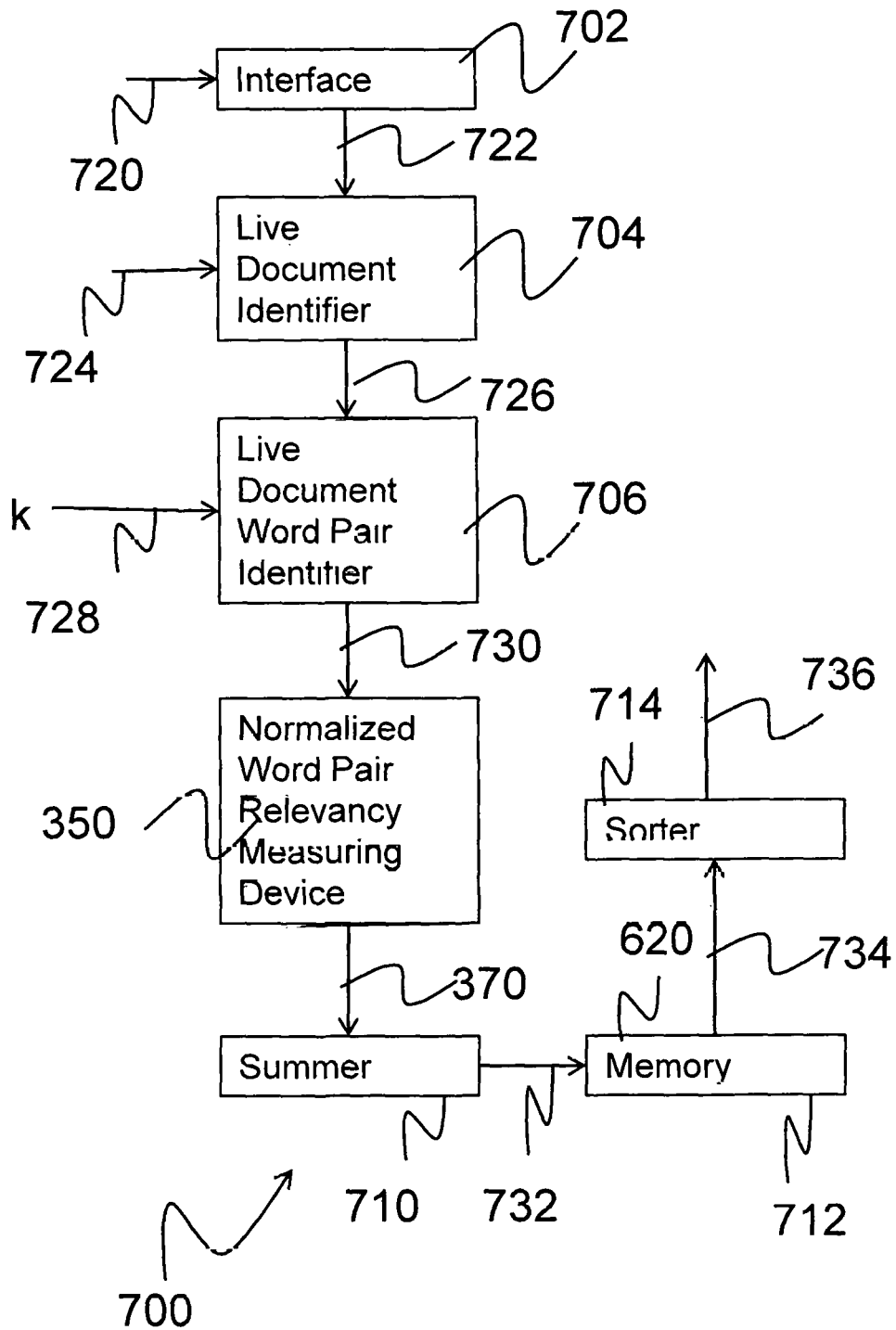
FIG. 18 illustrates a device for ranking documents of a live set utilizing normalized word pair relevancy measures.

A device for ranking documents utilizing the normalized document relevancy measure is illustrated in FIG. 18. The device 700 generally includes an interface 702, a live document identifier 704, a live document word pair identifier 706, a normalized word pair relevancy measurer 350, a document relevancy calculator 710, a memory 712, and a sorter 714.

The interface 702 retrieves information regarding the live documents to be ranked. The interface 702 includes an input 720 on which information regarding the live documents is received and an output 722 on which information regarding the live documents is provided.

The live document identifier 704 includes a first input in communication with the output 722 of the interface 702 and a second input 724 from which the user may identify a live document to be ranked. The identifier 704 further includes an output 726 on which information regarding the live document is provided.

The live document word pair identifier 706 includes a first input in communication with the output 726 of the live document identifier 704 and a second input 728 from which a user may define a keyword, k. The live document word pair identifier further includes an output 730 on which the identified live document seed word-keyword pairs (d,k) are provided.

The normalized word pair relevancy measurer 350 includes an input in communication with the output 730 of the live document word pair identifier 706 and an output 370. The normalized word pair relevancy measurer 350 is described in detail in connection with FIG. 13. The identified live document seed word-keyword pairs are provided to the normalized word pair relevancy measurer 350 and the normalized word pair measurer 350 provides the normalized word pair relevancy measure for each of the live document seed word-keyword pairs for the identified document on the output 370.

The document relevancy calculator 710 is provided by a summer. The summer 710 includes an input in communication with the output 370 and an output 732. The summer sums the normalized word pair relevancy measures of the live document word pairs and provides the sum as the normalized document relevancy measure on the output 732.

The memory 712 includes an input in communication with the output 732 of the summer 710 and an output 734. The memory 712 stores the sums provided by the summer for each live document identified by the live document identifier 704. If relevancy relative to multiple keywords is to be evaluated, the memory 172 includes normalized document relevancy measures for each keyword to be evaluated.

The sorter 714 includes an input in communication with the output 734 of the memory 712 and an output 736. The sorter 714 receives the document relevancy measures from the memory 712 and sorts the measures to provide a ranking of the document relevancy measures on the output 736. If normalized document relevancy measures provided by the memory, include the document relevancy measures for multiple keywords, the ranking provided by the sorter provides an indication as to the relevancy of the live documents relative to multiple keywords.

Just as the normalized word pair relevancy calculation, $s'_{d,k}$, provided clearer results than the word pair relevancy measure, $s'_{d,k}$, by normalizing the relevancy relative to reference words, the normalized document relevancy calculation S(D~k|A) provides a clearer result than the document relevancy calculation S(D~k) by normalizing the relevancy relative to reference words. The normalized word pair relevancy measures, $s'_{d,k}$, utilized in the normalized document measure have a mean of 0 for reference words. Thus, the normalized word pair measures for each live document seed word-keyword pair (d,k) of the document, D, can simply be added to provide the normalized document measure and will minimally impact the normalized document relevancy measure when many reference words occur in the document.

At least two methods for calculating the normalized relevancy measure $s'_{d,k}$ have been described above and it is to be understood that additional methods may be utilized for providing a normalized relevancy measure for the word pairs. Regardless of the method used to calculate the normalized relevancy measure for the word pairs, the normalized document measure, S(D~k|A), can be calculated as described herein.

This normalized document measure, S(D~k|A), works well when ranking documents relative to a single keyword and works fairly well for ranking documents with respect to multiple keywords as will be illustrated below. However, because shorter documents provide less data from which a conclusion can be drawn as to the relevancy of the document, D, to a keyword, k, the document relevancy calculations for shorter documents is less certain. Thus, the normalized document relevancy calculation can occasionally give misleading results when comparing short documents to rather long documents (e.g. comparing a tweet to a book) but is particularly useful when ranking documents which are of similar length, for example, within a couple thousand words of each other.

In order to overcome the difficulties of ranking documents of varying length, an even more rigorous method for measuring the relevancy of a keyword to a document is provided. This method provides a modified document relevancy measure which requires the use of a reference set of documents Δ. The reference set of documents, Δ, represents a large set of documents. The reference set of documents, Δ, could be, for example, the training set of documents which was used to determine the relevancy measures of the seed word-keyword pairs or it could be a different set of documents distinct from the training set of documents and distinct from the live set of documents. It is important, however, that the reference set of documents, Δ, is large enough that the probability of observing particular relevancy measures between a keyword and a document in the live set can be accurately estimated. Whether the reference set of documents, Δ, is sufficiently large heavily depends on the type of data being analyzed in the live set.

Figure 16A:
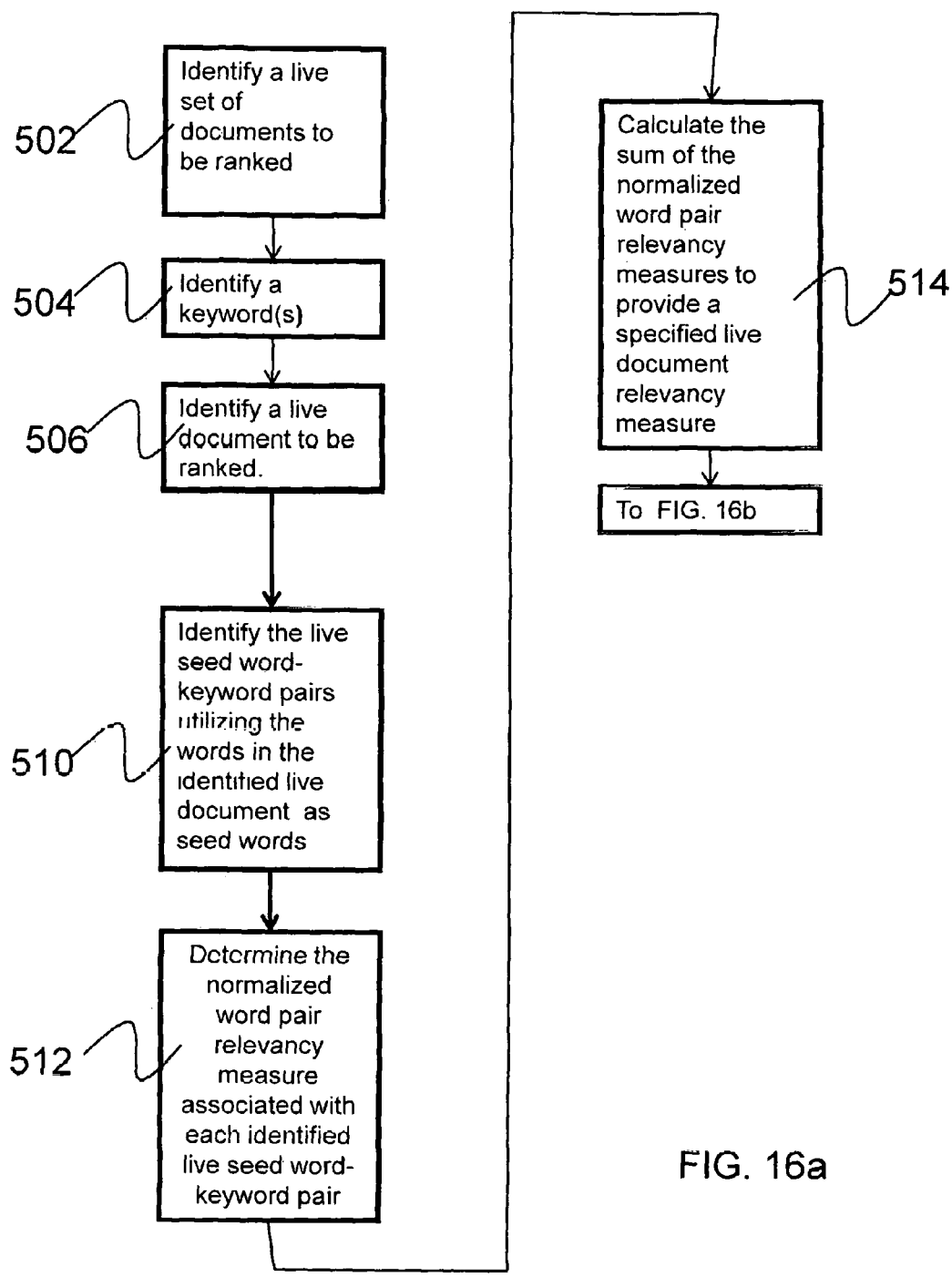
FIGS. 16*a*-16*c* illustrate a method of ranking documents of a live set based upon a modified document measure.
Figure 16B:
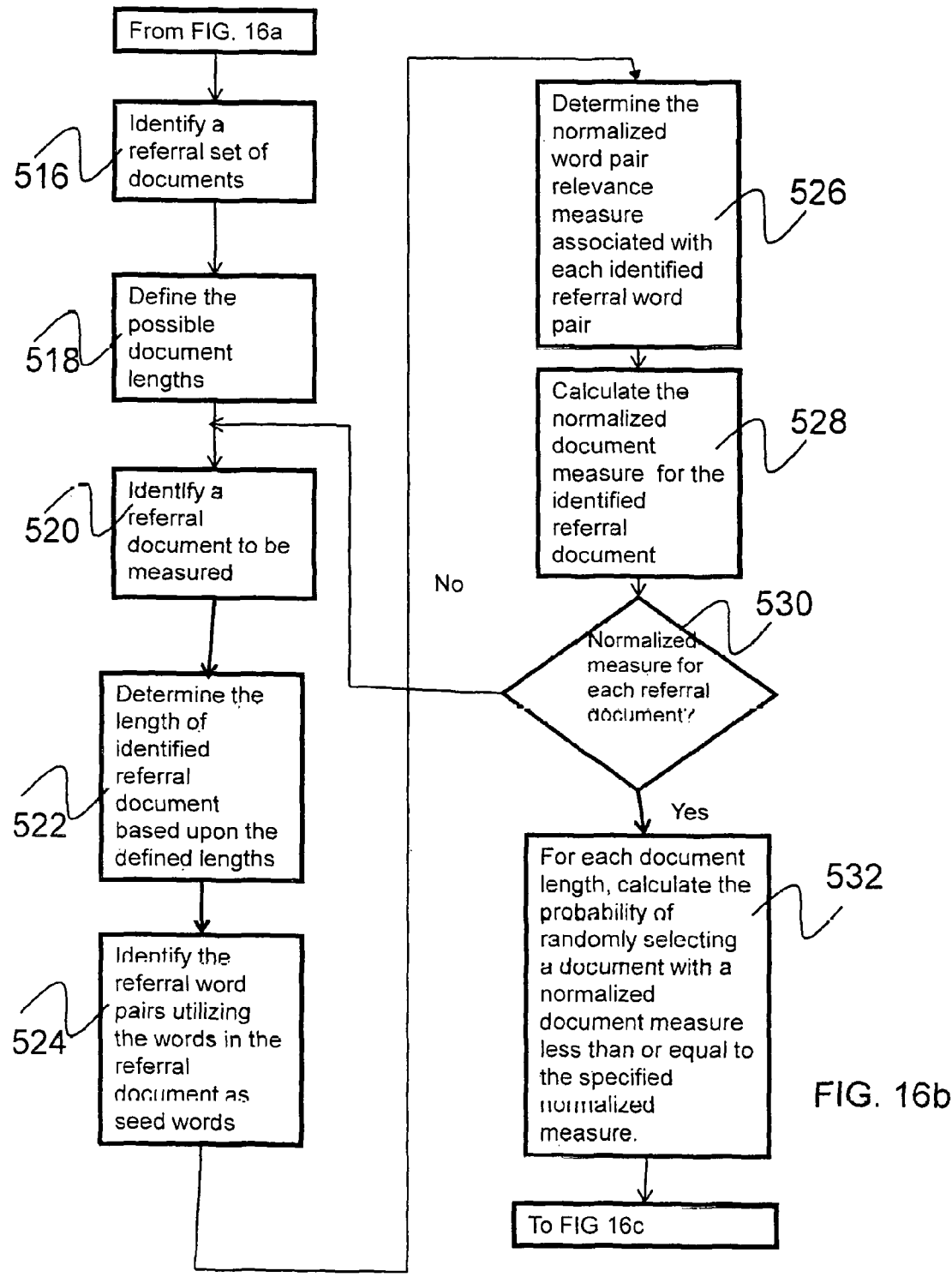
Figure 16C:
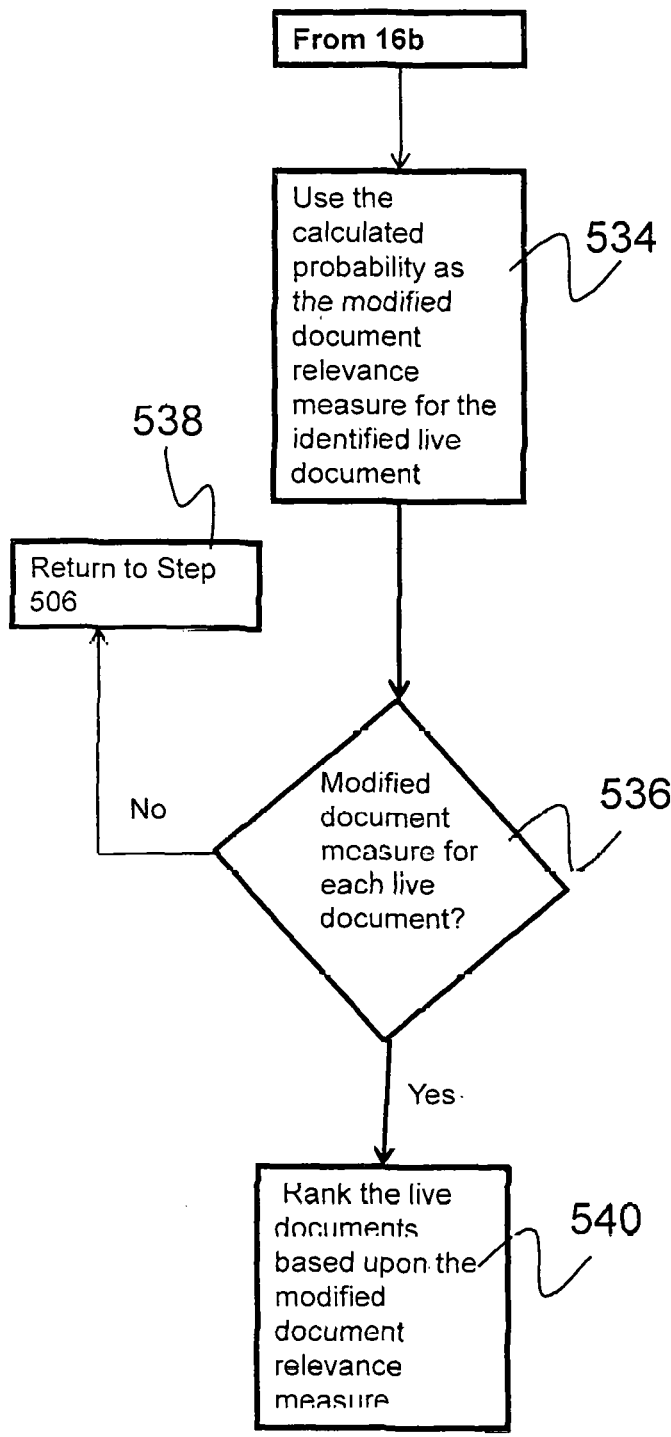

The modified document ranking method is illustrated in FIGS. 16a-16c. The process begins at step 502 by identifying the live set of documents. At step 504 a keyword is identified. At step 506 a live document to be ranked is identified. At step 510, the seed word-keyword pairs are identified utilizing the words in the identified live document as seed words. Next, at step 512 the normalized word pair relevancy measure associated with each identified live seed word-keyword pair is determined. At step 514 the sum of the normalized word pair relevancy measures is calculated to provide a specified live document relevancy measure.

Proceeding to step 516 (See, FIG. 16*b*), a set of documents is identified as the referral set of documents, Δ. Next, at step 518 the possible document lengths are defined. For example, defined possible document lengths may be <500 words, 500-999 words, 1000-1999 words, 2000-2999 words, etc. At step 520, a referral document from the set, Δ, to be measured is identified. At step 522, the length of the document to be measured is determined based upon the defined document lengths. At step 524, the referral document word pairs are identified utilizing the words in the referral document as seed words. Next, at step 526, the normalized word pair relevancy measure, s'$_{d,k}$, associated with each identified referral word pair is determined. The normalized word pair relevancy measure, s'$_{d,k}$, for each referral word pair is determined as discussed above.

At step 528, the sum of the normalized word pair relevancy measures is calculated to provide the normalized document relevancy measure of the referral document. At step 530 it is determined whether all normalized document measures have been calculated for each referral document in the referral set. If at step 530 all normalized document measures have not been calculated, then the process returns to step 520. Once it has been determined at step 530 that the normalized document measure has been calculated for each document of the referral set, the process proceeds to step 532. At step 532, for each referral document length that has been determined, a referral probability is calculated. Each referral probability represents the probability of randomly selecting a document with a normalized document measure less than or equal to the specified normalized measure from step 514. This probability is represented as follows:

$$S(D\sim k|\Delta)=P(S(D'\sim k)\leq S(D\sim k)|D'\epsilon\Delta)$$

At step 534 (see FIG. 7*c*), the probability S(D~k|A) calculated at step 532 is determined to be the modified document relevancy measure for the identified live document. Thus, the modified normalized document relevancy measure of the live document is provided by the probability that a document D' of length |D|, randomly selected from the referral set has a normalized document measure SD'~k less than or equal to a specified live document measure S(D~k). An inquiry is provided at step 536 to determine whether the modified document measure for each live document has been determined. If the modified document measure for each live document has not been determined, at step 538 the process returns to step 506. If at step 536 it is determined that the modified normalized document measure for each live document has been determined, the process proceeds to step 540 where the live documents are ranked based upon the modified document relevancy measures.

Figure 19:
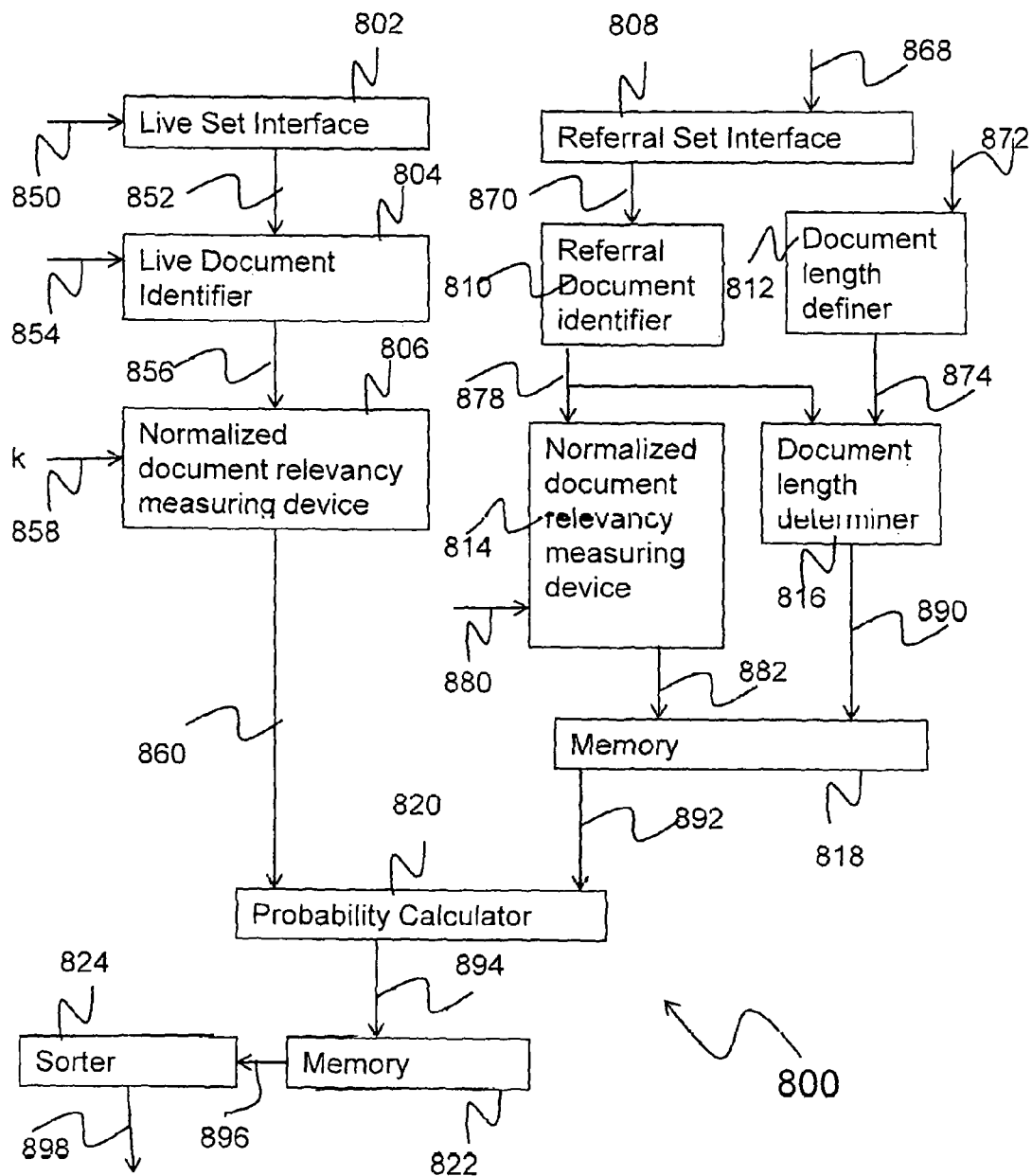
FIG. 19 illustrates a method of ranking documents of a live set based upon a modified document measure.

A device for determining a modified document ranking is illustrated in FIG. 19. The device 800 generally includes a live document set interface 802, a live document identifier 804, a normalized document relevancy measurer 806, a referral set interface 808, a referral document identifier 810, a document length identifier 812, a normalized document relevancy measuring device 814, a document length identifier 816, a memory 818, a probability calculator 820, a memory 822, and a sorter 824.

The interface 802 retrieves information regarding the live documents to be ranked. The interface 802 includes an input 850 on which information regarding the live documents is received and an output 852 on which information regarding the live documents is provided.

The live document identifier 804 includes a first input in communication with the output 852 of the interface 802 and a second input 854 from which the user may select a live document to be ranked. The identifier 804 further includes an output 856 on which information regarding the selected live document is provided.

The normalized document relevancy measuring device 806 includes a first input in communication with the output 856 of the live document identifier 804 and a second user defined input 858 on which a user defines the keyword, k. The normalized document relevancy measuring device 806 includes an output 860. The normalized document relevancy measuring device 806 calculates the normalized document relevancy for the selected document relative to the keyword, k, in a manner similar to the normalized document relevancy measuring device 700 described in detail in connection with FIG. 18. The normalized document relevancy measure provided by the device 806 is provided on the output 860.

The referral set interface 808 includes an input 868 for receiving information regarding the referral set, A. The referral set interface 808 further includes an output 870 on which information regarding documents in the referral set, Δ, is provided.

The document length definer 812 includes a user input 872 on which the user can define document length ranges and an output 874 on which the document length range information is provided.

The referral document identifier 810 includes an input in communication with the output 870 of the referral set interface 808. The referral document identifier 810 identifies a referral document from the set Δ. The referral document identifier includes an output 878 on which information regarding the selected referral document is provided.

The normalized document relevancy measuring device 814 includes a first input in communication with the output 878 of the referral document identifier 810 and a second user defined input 880 on which a user defines the keyword, k. The normalized document relevancy measuring device 814 includes an output 882. The normalized document relevancy measuring device 810 calculates the normalized document relevancy for the selected referral document relative to the keyword, k, in a manner similar to the normalized document relevancy measuring device 700 described in detail in connection with FIG. 18. The normalized document relevancy measure provided by the device 814 is provided on the output 882.

The document length determiner 816 includes a first input in communication with the output 878 of the referral document identifier and a second input in communication with the output 874 of the document length definer. The document length determiner 816 includes an output 890. The document length determiner 816 determines the length of the selected referral document based upon the defined document lengths provided by the document length definer 874 and provides the determined length of the selected referral document on the output 890.

The memory 818 includes a first input in communication with the output 882 of the normalized document relevancy measuring device 814 and a second input in communication with the output 890 of the document length determiner 816. The memory includes an output 892 on which normalized document relevancy measures corresponding to the length of the referral document is provided.

The probability calculator 820 includes a first input in communication with the output 860 of the normalized document relevancy measuring device 806 and a second input in communication with the output 892 of the memory 818. The probability calculator calculates the probability that a document randomly selected from the document set $\Delta$ and having a particular length will have a document relevancy score less than the document relevancy score provided by the device 806. This probability calculated by the calculator 820 defines the modified document relevancy measure for the selected live document and is provided on the output 894.

The memory 822 includes an input in communication with the output 894 of the probability calculator 820 and an output 896. The memory 822 stores the modified document relevancy measure for each live document to be ranked.

The sorter 824 includes an input in communication with the output 896 of the memory 822. The sorter 898 further includes an output 898. The sorter receives the modified document relevancy measures for each of the live documents to be ranked and sorts the measures to provide a ranking of the live documents in the live document set relative to the keyword 858. In the event that multiple keywords are utilized, the sorter sorts the measures to provide a ranking of the live documents relative to the multiple keywords.

Use of the modified document relevancy measure further reduces any bias that exists when ranking documents of varying lengths, provided that the referral set of documents, $\Delta$, used to estimate the probabilities has documents of varied length and subject. Because this measure allows documents of different lengths to be analyzed with respect to different keywords on the same footing, it is suitable for most scenarios.

SEARCHING WITH MULTIPLE KEYWORDS AND BOOLEAN SEARCHING

Measuring the relevancy of documents to multiple keywords is useful for clarifying rankings and adding precision to the rankings by letting the searcher employ operations that mimic the Boolean operations of OR, AND, and NOT. Approximations of these Boolean operations can be used with the document relevancy measure, the normalized document relevancy measure, and the modified document measure to clarify the rankings of documents. The relevancy measures for each of the Boolean operations OR, AND, NOT for each of the document relevancy measure, normalized document relevancy measure and modified document relevancy measure are provided below.

OR (V)

The following equations provide approximations for the Boolean operation OR.

$$S([D{\sim}k_1]V[D{\sim}k_2])=\max\{S(D{\sim}k_1),S(D{\sim}k_2)\}$$

This first equation provides an option for ranking a document's relevancy to either a keyword, $k_1$, OR keyword, $k_2$, based on a document relevancy measure.

$$S([D{\sim}k_1]V[D{\sim}k_2]|A)=\max\{S(D{\sim}k_1|A),S(D{\sim}k_2|A)\}$$

This second equation provides an option for ranking a document's relevancy to either a keyword $k_1$ OR keyword, $k_2$, based on a normalized document relevancy measure. As noted above, the normalized word pair measures for referral words have a mean of zero (0). Thus, the word pair measures can simply be added to give the document relevancy measure. Furthermore, the document relevancy for multiple keywords $k_1$, $k_2$, can be directly utilized to measure the relevancy of a document with respect to multiple keywords.

$$S([D{\sim}k_1|\Delta]V[[D{\sim}k_2\|\Delta]])=1-P(S(D'{\sim}k_1)\geq S(D{\sim}k_1),S(D'{\sim}k_2)\geq S(D{\sim}k_2)|D'\epsilon\Delta)$$

This third equation provides an option for ranking a document's relevancy to either a keyword $k_1$ OR keyword, $k_2$, based on a modified document relevancy measure. Although the first and second equations provide a useful approximation of the Boolean operation OR, the third equation, which utilizes the modified document relevancy measure provides an even more accurate approximation of the Boolean operation OR. In order to approximate the Boolean operation OR utilizing the modified document relevancy measure, however, the document relevancy measure of the documents in a training set $\Delta$ must be determined.

AND (*)

The following equations provide approximations for the Boolean operation AND.

$$S([D{\sim}k_1]*[(D{\sim}k_2])=S(D{\sim}k_1)\cdot S(D{\sim}k_2)$$

This first equation provides an option for ranking a document's relevancy to both keyword, $k_1$, AND keyword, $k_2$, based on a document relevancy measure.

$$S([D{\sim}k_1]*[D{\sim}k_2]|A)=S(D{\sim}k_1|A)+S(D{\sim}k_2|A)$$

This second equation provides an option for ranking a document's relevancy to both a keyword $k_1$ AND keyword, $k_2$, based on a normalized document relevancy measure.

$$s([D{\sim}k_1|\Delta]*[[D{\sim}k_2|\Delta]])=P(S(D'{\sim}k_1)\leq S(D{\sim}k_1),S(D'{\sim}k_2)\leq S(D{\sim}k_2)|D'\epsilon\Delta)$$

This third equation provides an option for ranking a document's relevancy to both a keyword $k_1$ AND keyword, $k_2$, based on a modified document relevancy measure. Although the first and second equations provide a useful approximation of the Boolean operation AND, the third equation, which utilizes the modified document relevancy measure, achieves an accurate approximation of the Boolean operation AND. In order to approximate the Boolean operation AND utilizing the modified document relevancy measure, however, the document relevancy measure of the documents in a training set $\Delta$ must be determined.

NOT ($\nparallel$)

The most difficult of the three operations to use for clarifying rankings in an intuitive manner is NOT, which may be used to find documents not relevant to a keyword. The problem with using NOT to clarify rankings based on relevancy stems from the fact that humans can fairly easily determine if a document is not relevant to a keyword in a binary fashion, but not in a ranking fashion. To illustrate this issue, consider a search that includes a document about automobiles and a document about astronomy, with a keyword of NOT-flower. Although humans would generally conclude that both documents correspond to NOT-flower, they would have trouble determining which document ranks higher with respect to NOT-flower.

A method for providing the NOT operation is to simply have NOT correspond to the inverse of the measure.

$$S([D \sim k_1] * [D \div k_2]) = \frac{S(D \sim k_1)}{S(D \sim k_2)}$$

This equation utilizes the document relevancy measure and the multiplicative inverse to denote the exclusion of a particular keyword.

Another method for providing the NOT operation is as follows:

$$S([D \sim k_1]*[D*k_2]|A) = S(D \sim k_1 A) - S(D \sim k_2|A)$$

This equation utilizes the normalized document relevancy measure and the additive inverse, to denote the exclusion of a particular keyword.

Another alternative is to take advantage of the set of documents, $\Delta$, using $$S([D \sim k_1|\Delta]*[[D \not\sim k_2|\Delta]]) = P(S(D' \sim k_1) \leq S(D \sim k_1), S(D' \sim k_2) \geq S(D \sim k_2)|D' \in \Delta)$$

This equation utilizes the modified document measure to find the probability of observing documents at random in the referral set, $\Delta$, that are both more relevant to the keyword $k_1$ while also being less relevant to the keyword $k_2$ than the document D.

The present invention provides several advantages over prior art methods. For example, the present invention provides a method of determining relevancy for the purpose of ranking documents within large repositories even when other search and rank methods such as Boolean type searches are inadequate, for example, when the keyword is not present in the documents searched.

Another advantage provided by the present invention is the ability to search documents in multiple languages and to search documents in languages other than the language of the keyword. Without the present invention, choosing a keyword to find documents related to a particular topic can be challenging when the searcher does not know the language or the precise nomenclature used by the authors of the various documents being searched. This can be particularly difficult when the documents in the live set span multiple languages, as is the case with web pages on the internet. In contrast to prior art methods which require use of a translation tool to translate the documents to be searched to the language of the searcher prior to searching, no such translation is required by the present invention. By simply including a translational dictionary in the training set of documents, the relevancy between the words will be apparent.

Additionally, the present invention will determine the relevancy of words in a foreign language even if the word is not defined in a translational dictionary. For example, as societies and languages evolve (e.g. as new technologies and new concepts are introduced, each society will develop a nomenclature to accommodate them with either novel words or novel combinations of words) there will be temporary gaps in translational dictionaries. Using the prior art methods, therefore, no relevancy will be determined between the keyword and the translation of the keyword due to the gap. Thus the prior art method of translating documents does not work well for terms that are not well established in the lexicon and do not have counterparts in the translational dictionaries. The present invention, however, overcomes this limitation by including translational dictionaries along with texts from the various languages in the training set. When the calibrated expected search distances are calculated, the sense of relevancy will be drawn from words in the searcher's language to the words in other languages. So long as the search word occurs in the training set, even if the translational dictionaries are incomplete, the document relevancy measures will account for these foreign language terms. Thus, utilizing the present invention, a searcher may use a keyword in the searcher's own language to identify relevant documents from other languages without requiring translation of the documents.

The present invention also provides for easy clustering of documents even in the event the keyword is not present in the document. For example, a number of documents could be measured for relevancy relative to keywords such as physics, biology, or chemistry. In addition, the documents could be measured for relevancy relative to the keyword politics. These measures of relevancy can then be combined to determine a cluster of documents relative to physics and politics, for example. Clustering of these documents relative to the keywords "physics" and "politics" is possible even when the documents do not include either or both keywords.

The present invention provides a relatively simply way of determining relevance without requiring significant involvement by an expert to create the relevance model. For example, prior art methods of ranking utilize algorithms which attempt to take advantage of the nuanced details of a document in order to rank the relevancy of that document. One method in particular utilizes the order of the words in the document may in an attempt to determine the meaning conveyed by the words. These methods seek to take advantage of the complexity of a language but require significant involvement by an expert to create the relevancy model. Utilizing the present invention, documents are treated as an unordered set of words for ranking purposes. Expert input concerning language structure is not needed and the process may be fully automated. The method of ranking documents provided by the present invention is based on a calculated expected search distance and reasonably mimics the ranking a person might perform without requiring involvement by an expert to model the complexity of the language and without requiring nuanced details regarding the document in the live or the training set, or human intervention.

While preferred embodiments of the present invention are shown and described, it is envisioned that those skilled in the art may devise various modifications of the present invention without departing from the spirit and scope of the appended claims.

The invention claimed is:

1. A device for determining a measure of relevancy for a seed word-keyword pair (d,k) comprising:
   a word identifier for identifying each unique word in the set of documents as a search word;
   a word pair identifier in communication with said word identifier and for combining the identified search words to define search word pairs;
   a unit portioner for portioning the set of documents into user-definable units, said unit portioner in communication with said interface and with said word pair identifier;
   a co-occurrence matrix generator in communication with said unit portioner and said word pair identifier for determining, for each defined search word pair, the number of units in which the identified search word pair occurs and for storing the number of occurrences in a co-occurrence matrix
   a probability matrix generator in communication with said co-occurrence matrix generator and for generating a probability matrix as a function of the co-occurrence matrix, a calibrating column vector generator, ψ, in communication with said co-occurrence matrix generator for generating a calibrating column vector;

a matrix normalizer in communication with said probability matrix generator for normalizing the probability matrix to form a transition matrix, R;

a word pair selector in communication with said word pair identifier for selecting the seed word-keyword pair to be measured, wherein said word pair selector provides a first column vector, $\vec{\Gamma}(d)$, relating to the seed word and a second column vector, $\vec{\Gamma}(k)$, relating to the keyword;

an expected search distance generator in communication with said word pair selector, said probability matrix generator and said matrix normalizer, for calculating the expected search distance of the seed word-keyword pair;

a weighted average expected search distance generator in communication with said expected search distance generator, said probability matrix generator, said matrix normalizer, and said calibrating column vector, said weighted average expected search distance generator for determining a weighted average expected search distance for the keyword; and a calibrator in communication with said expected search distance generator and said weighted average expected search distance generator, wherein said calibrator determines the relevancy, $s_{d,k}$, of the seed word to the key word, based upon said expected search distance and said weighted averaged expected search distance.

2. The device of claim 1, wherein the expected search distance generator further includes a user-defined input and wherein a summation generated by said expected search distance generator is limited by said user-defined input.

3. The device of claim 1, wherein the weighted average expected search distance generator further includes a user-defined input and wherein a summation generated by said weighted average expected search distance generator is limited by said user-defined input.

4. The device of claim 1, wherein said unit portioner portions the set of documents into paragraphs.

5. The device of claim 1, wherein said unit portioner portions the set of documents into sentences.

6. The device of claim 1, wherein the search words in the set of documents represent the rows and columns of the co-occurrence matrix and said probability matrix generator divides each entry in the co-occurrence matrix by a total number of the user-definable units and stores the results in the probability matrix.

7. The device of claim 1, wherein said expected search distance is provided by:

$$\overline{c}_{d,k} = \sum_{n=1}^{g} n[\vec{\Gamma}(d)]^T \cdot \left[(I - \vec{\Gamma}(k) \otimes \vec{\Gamma}(k)) \cdot R \cdot (I - \vec{\Gamma}(k) \otimes \vec{\Gamma}(k))\right]^{n-1} \cdot M \cdot \vec{\Gamma}(k)$$

wherein:
I represents an identity matrix;
$\vec{\Gamma}(d)$ represents a column vector for selecting values in the transition matrix related to the word, d;
$\vec{\Gamma}(k)$ represents a column vector for selecting values in the transition matrix related to the word, k;
R represents the transition matrix;
M represents the probability matrix; and
g represents the upper limit of the summation as selected by the user.

8. The device of claim 1, wherein said weighted average expected search distance is provided by:

$$\overline{c}_k = \sum_{n=1}^{g} n[\vec{\psi}]^T \cdot \left[(I - \vec{\Gamma}(k) \otimes \vec{\Gamma}(k)) \cdot R \cdot (I - \vec{\Gamma}(k) \otimes \vec{\Gamma}(k))\right]^{n-1} \cdot M \cdot \vec{\Gamma}(k)$$

wherein,
I represents an identity matrix;
$\vec{\Gamma}(k)$ represents a column vector for selecting values in the transition matrix related to the word, k;
$\vec{\psi}$ is a column vector representing the commonality of words in the co-occurrence matrix
R represents the transition matrix;
M represents the probability matrix; and
g represents the upper limit of the summation as selected by the user.

9. The device of claim 1, wherein said matrix normalizer sums, for each row in the probability matrix, each row, divides each entry in the transition matrix by the sum, and stores the result in a corresponding location in the transition matrix.

10. A method of determining a word pair relevancy measure for a seed word-keyword pair (d,k), comprising the steps of:
identifying a set of documents;
identifying search words from the set;
pairing a first search word and a second search word to define a search word pair;
portioning the set of documents into units;
creating a co-occurrence matrix identifying the number of co-occurrences of the search word pair in said units;
calculating a conditional co-occurrence probability associated with said search word pair, wherein said conditional co-occurrence probability is based upon said co-occurrence matrix;
calculating a transition probability associated with said search word pair, wherein said transition probability is based upon said co-occurrence matrix; and
calculating an expected search distance for said seed word-keyword pair, wherein said expected search distance is based upon said conditional co-occurrence probability and said transition probability and wherein said expected search distance is defined as the expected number of units traversed to transition from the seed word to a unit that contains the keyword.

11. The method of claim 10, further comprising the step of:
calculating a word pair relevancy measure based upon said expected search distance.

12. The method of claim 10, wherein said step of calculating a conditional co-occurrence probability is provided by:

$$M_{i,j} = p(d_j \mid d_i) = \frac{P(d_j, d_i)}{P(d_i)} = \frac{C_{j,i}}{C_{i,i}}$$

wherein,
P($d_j|d_i$)) represents the probability of observing $d_j$ in a unit given that $d_i$ is in the unit;

P($d_j$, $d_i$) represents the probability of observing $d_j$ and $d_i$ together in a unit, P($d_i$) represents the probability of observing $d_i$ in a unit;

$C_{j,i}$ represents the value of the co-occurrence matrix associated with the word pair ($d_i$, $d_j$); and $C_{j,i}$ represents the value of co-occurrence matrix associated with word pair ($d_i$, $d_j$).

13. The method of claim 10, wherein said step of calculating a transition probability is provided by:

$$R_{i,j} = \frac{C_{i,j}}{\Sigma_z C_{i,z}}$$

$C_{j,i}$ represents the value of the co-occurrence matrix associated with the word pair ($d_i$, $d_j$); and $C_{i,z}$ represents the values of the co-occurrence matrix in row i and column z, associated with the word pair ($d_i$, $d_z$).

14. The method of claim 10, wherein said step of calculating an expected search distance for the seed word-keyword pair, is provided by:

$$\overline{c}_{d,k} = \sum_{n=1}^{g} n[\vec{\Gamma}(d)]^T \cdot \left[(I - \vec{\Gamma}(k) \otimes \vec{\Gamma}(k)) \cdot R \cdot (I - \vec{\Gamma}(k) \otimes \vec{\Gamma}(k))\right]^{n-1} \cdot M \cdot \vec{\Gamma}(k)$$

wherein,

I represents an identity matrix;

$\vec{\Gamma}(d)$ represents a column vector for selecting values in the transition matrix related to the word, d;

$\vec{\Gamma}(k)$ represents a column vector for selecting values in the transition matrix related to the word, k;

R represents the transition matrix;

M represents the probability matrix; and g represents the upper limit of the summation as selected by the user.

15. The method of claim 14, further including the step of calculating a weighted average expected search distance provided by:

$$\overline{c}_k = \sum_{n=1}^{g} n[\vec{\psi}]^T \cdot \left[(I - \vec{\Gamma}(k) \otimes \vec{\Gamma}(k)) \cdot R \cdot (I - \vec{\Gamma}(k) \otimes \vec{\Gamma}(k))\right]^{n-1} \cdot M \cdot \vec{\Gamma}(k)$$

wherein, $\vec{\psi}$ is a column vector representing the commonality of words in the co-occurrence matrix.

16. The method of claim 15, further including the step of calculating a word pair relevancy measure, wherein said word pair relevancy measure is provided by:

$$s_{d,k} = \frac{\overline{c}_{d,k}}{\overline{c}_k}$$

17. The method of claim 16, further including the step of normalizing the word pair relevancy measure.

18. The method of claim 17, wherein said step of normalizing includes the steps of:

defining a set of reference words;

calculating a word pair relevancy for each reference word relative to the keyword; and calculating the normalized word pair relevancy measure based upon said word pair relevancy for each reference word relative to the keyword.

19. The method of claim 18, wherein said normalized word pair relevancy is defined as:

$$s'_{d,k} = \frac{s_{d,k} - \mu_k(A)}{\sigma_k(A)}$$

wherein, $$\mu_k(A) = \frac{1}{|A|} \sum_{a \in A} s_{a,k}, \text{ and}$$

$$\sigma_k(A) = \sqrt{\left(\frac{1}{|A|} \sum_{a \in A} s_{a,k}^2\right) - \left(\frac{1}{|A|} \sum_{a \in A} s_{a,k}\right)^2}$$

20. The method of claim 18, wherein the set of reference words includes common words.

* * * * *